United States Patent [19]

Johnson et al.

[11] Patent Number: 5,001,554

[45] Date of Patent: Mar. 19, 1991

[54] TERMINAL AUTHORIZATION METHOD

[75] Inventors: Lee R. Johnson, Lawrenceville; Elizabeth A. Smith, Cumming; Howard L. Myers, Lawrenceville; Curt M. Kuban, Snellville, all of Ga.

[73] Assignee: Scientific-Atlanta, Inc., Atlanta, Ga.

[21] Appl. No.: 340,731

[22] Filed: Apr. 20, 1989

Related U.S. Application Data

[63] Continuation-in-part of Ser. No. 289,218, Dec. 23, 1988.

[51] Int. Cl.$^5$ .......................... H04N 7/10; H04H 1/00
[52] U.S. Cl. ..................................... 358/86; 358/349; 455/3; 455/26.1
[58] Field of Search ....................... 358/349, 86; 455/3, 455/6, 26.1, 151, 186

[56] References Cited

U.S. PATENT DOCUMENTS

| | | | |
|---|---|---|---|
| 3,221,098 | 11/1965 | Feldman et al. | 178/5.8 |
| 3,833,757 | 9/1974 | Kirk, Jr. et al. | 178/5.6 |
| 3,894,176 | 7/1975 | Mellon | 178/5.1 |
| 3,894,177 | 7/1975 | Howell et al. | 178/5.6 |
| 3,944,742 | 3/1976 | Cunningham | 178/66 |
| 3,968,327 | 7/1976 | Gregg, III | 178/6.8 |
| 3,997,718 | 12/1976 | Ricketts et al. | 178/6.8 |
| 4,008,369 | 2/1977 | Theurer et al. | 358/84 |
| 4,012,583 | 3/1977 | Kramer | 358/84 |
| 4,031,543 | 6/1977 | Holz | 358/86 |
| 4,072,825 | 2/1978 | McLay et al. | 179/18 |
| 4,194,181 | 3/1980 | Brundage | 340/286 |
| 4,264,924 | 4/1981 | Freeman | 358/86 |
| 4,303,937 | 12/1981 | Cook | 358/86 |
| 4,313,213 | 1/1982 | Farina et al. | 455/186 |
| 4,319,227 | 3/1982 | Nicholson et al. | 358/165 |
| 4,360,828 | 11/1982 | Briggs, Jr. et al. | 358/86 |
| 4,425,579 | 1/1984 | Merrell | 358/86 |
| 4,455,570 | 1/1984 | Saeki et al. | 358/86 |
| 4,507,680 | 3/1985 | Freeman | 358/86 |
| 4,510,623 | 4/1985 | Bonneau et al. | 358/349 |
| 4,536,791 | 8/1985 | Campbell et al. | 358/122 |
| 4,538,174 | 8/1985 | Gargini et al. | 358/86 |
| 4,550,341 | 10/1985 | Naito | 358/114 |
| 4,567,512 | 1/1986 | Abraham | 358/86 |
| 4,575,750 | 3/1986 | Callahan | 358/86 |
| 4,620,229 | 10/1986 | Amano et al. | 358/349 |
| 4,698,670 | 10/1987 | Natty | 358/86 |
| 4,718,107 | 1/1988 | Hayes | 455/4 |
| 4,734,764 | 3/1988 | Pocock et al. | 358/86 |
| 4,768,229 | 8/1988 | Benjamin et al. | 358/349 |
| 4,786,967 | 11/1988 | Smith, III et al. | 358/143 |
| 4,789,863 | 12/1988 | Bush | 340/825 |
| 4,792,972 | 12/1988 | Cook, Jr. | 380/20 |

FOREIGN PATENT DOCUMENTS

EP0178866A1 10/1985 European Pat. Off. .
EP0183626A2 11/1985 European Pat. Off. .

OTHER PUBLICATIONS

Patent Cooperation Treaty, International Search Report, Sep. 8, 1990, 3 pgs. PCT/US 90/02032.
International Broadcasting Convention, Venue, Metropole Conference and Exhibition Centre, Brighton, U.K., Sep. 21-25, 1984, 8 pgs.

Primary Examiner—Jin F. Ng
Assistant Examiner—Wing F. Chan
Attorney, Agent, or Firm—Banner, Birch McKie & Beckett

[57] ABSTRACT

A terminal apparatus for use in a cable television system which provides a plurality of channels capable of being tuned for display at a television receiver is provided. The apparatus includes a memory for storing data for generating a plurality of predetermined character screens and for storing deauthorization data, a character generator for generating character screens from the stored character screen data at the television receiver, a deauthorization mechanism responsive to the deauthorization data in the memory for deauthoring selected ones of the plurality of channels, and a controller for controlling the memory and the character generator, and for composing at least one predetermined character screen for display at the television receiver in accordance with the deauthorization of a channel by the deauthorization mechanism.

54 Claims, 15 Drawing Sheets

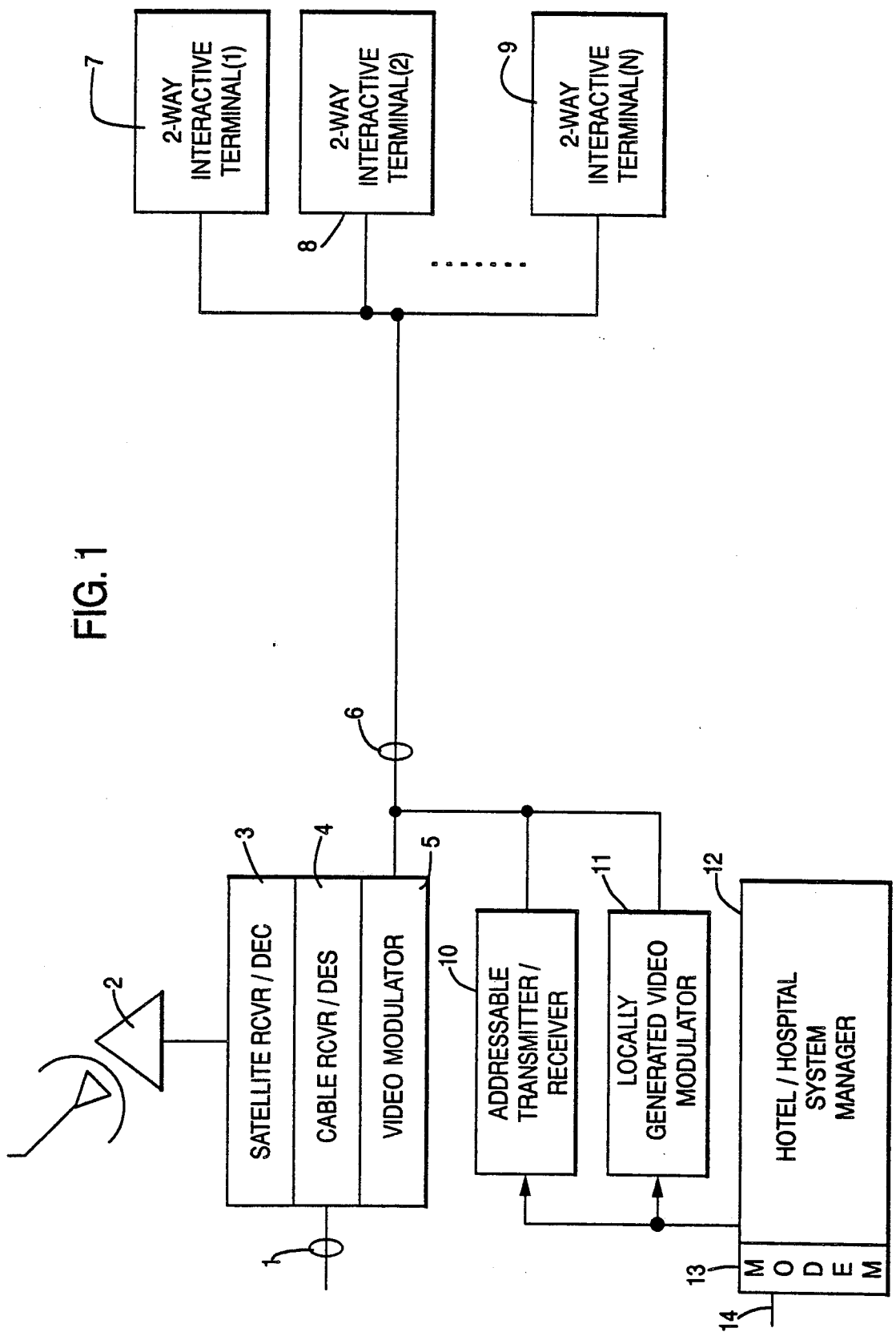

© 1988 SCIENTIFIC-ATLANTA, INC.

© 1988 SCIENTIFIC-ATLANTA, INC.

SCREEN #600

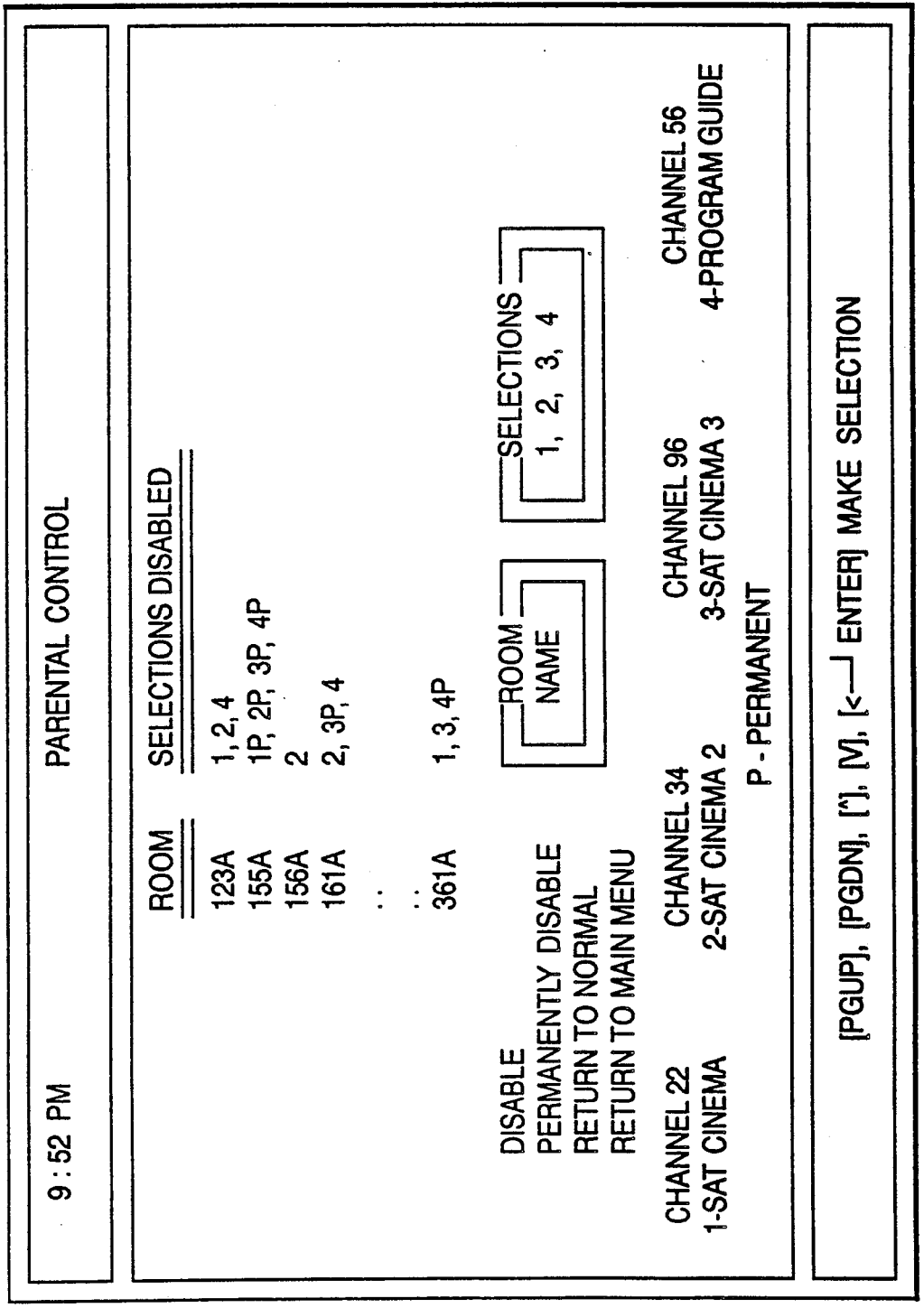

© 1988 SCIENTIFIC-ATLANTA, INC.

FIG. 13

PRE-BUYS © 1988 SCIENTIFIC-ATLANTA, INC.

9:52 PM

| ROOM | CREDIT | ROOM | CREDIT | ROOM | CREDIT | ROOM | CREDIT |
|------|--------|------|--------|------|--------|------|--------|
| 101  | $5.95  | 104  | $10.00 | 118  | $25.00 | 193  | $6.00  |
| 201  | $100.00| 225  | INFINITE |    |        |      |        |

ADD A ROOM
DELETE A ROOM
EXAMINE USAGE LOG
RETURN TO MAIN MENU

ROOM NAME [ ]   CREDIT [$999.99]

DEFAULT LIMIT-$0.00

NOTE: CREDIT AMOUNTS DO NOT INCLUDE TAX
[PGUP], [PGDN], ['], [M], [<─┘ ENTER] MAKE SELECTION

FIG. 14

© 1988 SCIENTIFIC-ATLANTA, INC.

VIDEO CONFRENCE ROOM ASSIGNMENTS

9:52 PM

TUESDAY 1:00 PM, SELECTION 1, SAT CIMEMA 1

| 101 | 102 | 103 | 104 | 105 | 106 | 107 |
| 108 | 202 | 203 | 207 | 315 | 332 | 355 |
| 403 | 407 | 412 | 443 | 448 | 477 | 499 |
| 566 | 577 | 588 | 599 | 611 | 622 | 633 |
| 644 | 655 | 667 | 668 | 689 | 697 | 701 |
| 702 | 711 | 719 | 773 | 788 | 999 | 1002 |
| BALLRM | BALRM1 | PENTHOS | POOL | | | |

ADD A ROOM
DELETE A ROOM
RETURN TO PREVIOUS MENU
RETURN TO MAIN MENU

ROOM

[PGUP], [PGDN], [↑], [↓], [↵ ENTER] MAKE SELECTION

TERMINAL AUTHORIZATION METHOD

This application is a continuation-in-part application of Application Ser. No. 289,218 filed Dec. 23, 1988 of Lee R. Johnson, Elizabeth A. Smith, and Howard L. Myers and is related by subject matter to copending Application Ser. Nos. 07/340,642, entitled "Cable Television Transaction Terminal"; Ser. No. 07/342,987, entitled "Storage Control Method and Apparatus for an Interactive Television Terminal"; Ser. No. 67/340,660, entitled "Interactive Room Status/Time Information System"; Ser. No. 07/340,967, entitled "Interactive Television Terminal with Programmable Background Audio or Video"; and Ser. No. 07/340,659, entitled "Terminal Polling Method" all filed concurrently herewith and incorporated herein by reference.

BACKGROUND OF THE INVENTION

The present invention generally relates to a terminal authorization method and, more particularly, to a method for establishing user friendly authorizations and deauthorizations to control an interactive terminal in a cable television system.

Two-way interactive cable television systems are known for transmitting entertainment, information and data signals over a cable facility to a plurality of users. Data may be transmitted and addressed to a particular subscriber over a separate data channel or a so-called "in-band" data channel. In a downstream direction, addressed control data may represent services authorized to a particular terminal or control commands to that terminal. In an upstream direction from a terminal to the service provider or system manager location, control data may represent selections made by a user in response to a polling request or at the time of user selection.

One environment in which two-way interactive cable television systems may be implemented is hotels. Typically, each hotel room or suite is provided with one or more televisions whose operation is governed by an associated set-top terminal. Channels may be tuned by entering a channel number to the terminal via an associated keyboard or an infrared remote control. Often the hotel guest has the option of authorizing his terminal to receive certain premium programming. The guest is charged an additional fee for viewing such premium programming. Premium programming may consist for example, of recently released movies, sporting events, concerts, etc.

It is desirable that a hotel operator be able to exercise a degree of control over premium programming. For example, a preview or "teaser" of a premium movie may be shown for a predetermined time in order to entice guests to purchase the movie. The hotel operator may further control the predetermined preview time for a particular movie. Additionally, a hotel operator may wish to control which guests may purchase premium programming.

From the perspective of a hotel guest, it may be desirable to control the ability to purchase premium programming. For example, certain premium programming may be unsuitable for young children and parents may wish to inhibit the ability of a child to purchase such programming. Additionally, a guest may desire to limit the number of premium purchases made, particularly if children may purchase programming.

SUMMARY OF THE INVENTION

Accordingly, it is an object of the present invention to provide a cable television system affording improved control to a system operator.

It is another object of the present invention to provide a cable television system affording improved control to a system user.

It is still another object of the present invention to provide a user friendly interface to cable television system.

The present terminal authorization method involves additional features to those normally provided in pay-per-view television systems. A system manager according to the present invention authorizes channel viewing in one of four modes: free, off, premium, and video conferencing. Flags are individually addressed to a particular terminal to modify the mode of viewing: premium no-bill, video conferencing enable, parental control override and premium programming prebuy.

The system manager is thus capable of configuring and reconfiguring a terminal depending on, for example, how a particular hotel room is being used. For parental control, an override parental flag may be downloaded for a particular premium channel at the parent's request. Also, the system manager may link a plurality of rooms and terminals together for a closed circuit video conference. Attempts by unauthorized guest to gain access to a disabled or unauthorized channel will actuate the display at the particular terminal of a screen message advising of the status of the channel promoting a more user friendly interface.

BRIEF DESCRIPTION OF THE DRAWINGS

A more complete appreciation of the present invention and many of the attendant advantages thereof will be readily obtained as the present invention becomes better understood through the following detailed description with reference to the accompanying drawings.

FIG. 1 is a block schematic diagram of an interactive entertainment system in accordance with the present invention applied in a hotel or hospital system environment.

FIG. 11 is a menu screen illustrating the override feature of the present invention.

FIG. 13 is a menu screen illustrating the prebuy feature of the present invention.

FIG. 14 is a menu screen illustrating the video conference feature of the present invention.

DETAILED DESCRIPTION

Figure 1A:
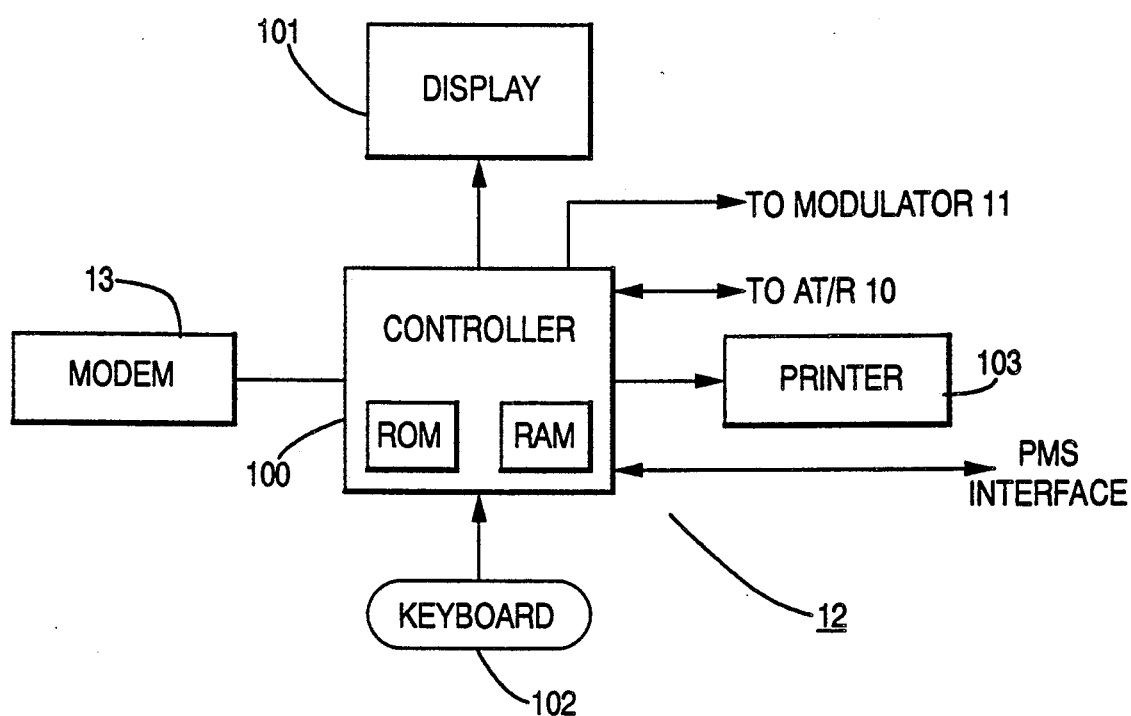
FIG. 1(a) is a block diagram of a system manager in the entertainment system of FIG. 1.

FIG. 1 is a block schematic diagram of an interactive entertainment system in accordance with the present invention. The depicted embodiment relates to its application in a hotel or hospital system environment. However, the present invention is not limited in this respect. The present invention may be applied in any two-way interactive entertainment system involving a distribution network including trunk lines and feeder cables of optical or coaxial cable. For example, satellite receiver and decoder 3, cable receiver and descrambler 4, video modulator 5, addressable transmitter/receiver 10, locally generated video modulator 11, and system manager 12 may all be located at the location of a cable television system head end. In this example, coaxial cable or optical fiber transmission link 6 can couple the cable television head end to two-way interactive terminals 7, 8, or 9 of the entertainment system located at individual subscriber premises.

The embodiment of FIG. 1 is especially exemplary of the application of the present invention in a hotel or hospital entertainment system. In this instance, transmission link 6 may comprise a coaxial or optical fiber cable link between an entertainment control center and N terminals. For example, terminals 7, 8 or 9 may be located in particular rooms of the hotel or hospital.

In particular, at the system control center, a satellite signal may be detected by satellite antenna 2 and then received and decoded at satellite receiver/decoder 3 for distribution via modulator 5 over a distribution cable 6 to the interactive terminals 7, 8 or 9 of the present invention. Additionally, a band of cable television channels received over cable facilities 1 are received and, if necessary, descrambled at cable receiver/descrambler 4. The descrambled video signals are then modulated at modulator 5 for distribution over distribution cable 6 to interactive terminals 7, 8 or 9. If desired, an optional scrambler may be provided for scrambling premium channel transmissions to interactive terminals 7, 8 or 9. Of course, terminal 7, 8 or 9, then, would include descrambler circuitry capable of descrambling the scrambled premium channel transmissions. Such circuitry is not shown in either FIG. 1 or 2, but would, for example, be preferable in a system involving distribution of signals to remote subscriber locations.

According to the exemplary embodiment of FIG. 1, the hotel or hospital location may be linked to other hotels or hospitals via data link 14. Data may be received by system manager 12 over data link 14 via modem 13. In this manner, the hotel or hospital system manager may maintain current status of all features and all interactive terminals of an entertainment system comprising a plurality of hotels. For example, entertainment schedules may be distributed over the data link from a network control center where the entertainment schedule is composed. System manager 12 comprises a data processing unit and an appropriate memory for storing status and features associated with all terminals in the system. System manager 12 further controls the generation of video channels at modulator 11, if necessary, for transmission over distribution cable 6 to two-way interactive terminals 7, 8 or 9. In particular, locally generated video modulator 11 includes the capability to generate signals for actuating the display of character screens at terminal locations in response to the control of the system manager 12 in the event, for example, that the terminals are unable to generate the character screens themselves.

The generation of complete screens of characters for transmission to a terminal according to the present invention for display is not required because the terminal (discussed below in greater detail with reference to FIG. 2) includes its own character generator 204. Consequently, locally generated video modulator 11 is optional. Instead, system manager 12 generates commands to generate screens, and not the screens themselves, for transmission via addressable transmitter 10 to an interactive terminal in accordance with the present invention. In a "hybrid" system including terminals without character generators as well as terminals according to the present invention, locally generated video modulator 11 would be necessary. The screens generated either at the terminal or by way of modulator 11, for example, may relate to the provision of information to guests or patients about hotel or hospital services, respectively.

System manager 12 further controls an addressable transmitter/receiver 10 for transmitting addressed communications which are uniquely addressed to terminals 7, 8 or 9 and receiving communications at random times or in response to polling requests of terminals. The addressed transmitter 10 according to FIG. 1 may transmit addressed information on a separate data carrier, for example, at 108 megahertz and receive information transmitted in a so-called upstream direction from the terminals on another separate data channel at 25 megahertz for example. In an alternative embodiment, all downstream communications may be transmitted in-band or within a particular television channel transmission, for example, within the horizontal or vertical intervals of transmitted video signals. Consequently, the system manager 12 accomplishes in-band signalling by controlling data input into the video signals transmitted via either modulators 5 or 11. A separate data carrier for each direction of transmission may be preferred due to increased data carrying capacity. For upstream transmission, a telephone line or spread spectrum transmission may be employed as an alternative to a separate data channel.

In addition to specifically addressed data communications with the interactive terminals 7, 8 or 9, the system manger may also address communications globally to all interactive terminals, which global communications may or may not require a terminal to respond. Such global communications, for example, may be addressed to a global address representing all terminals in the particular hotel system or to a group address representing a group of terminals within the system having a commonality of interest.

Referring to FIG. 1(a), system manager 12 particularly comprises a processor 100, an associated memory for storing control algorithms ROM, a read/write memory for storing as many as thousands of uniquely identified screens RAM, a display screen 101 and a keyboard 102 for screen design and modification. An optional printer 103 is provided for printing out room checkout bills in a similar manner as would occur at a hotel front desk during checkout.

Figure 2:
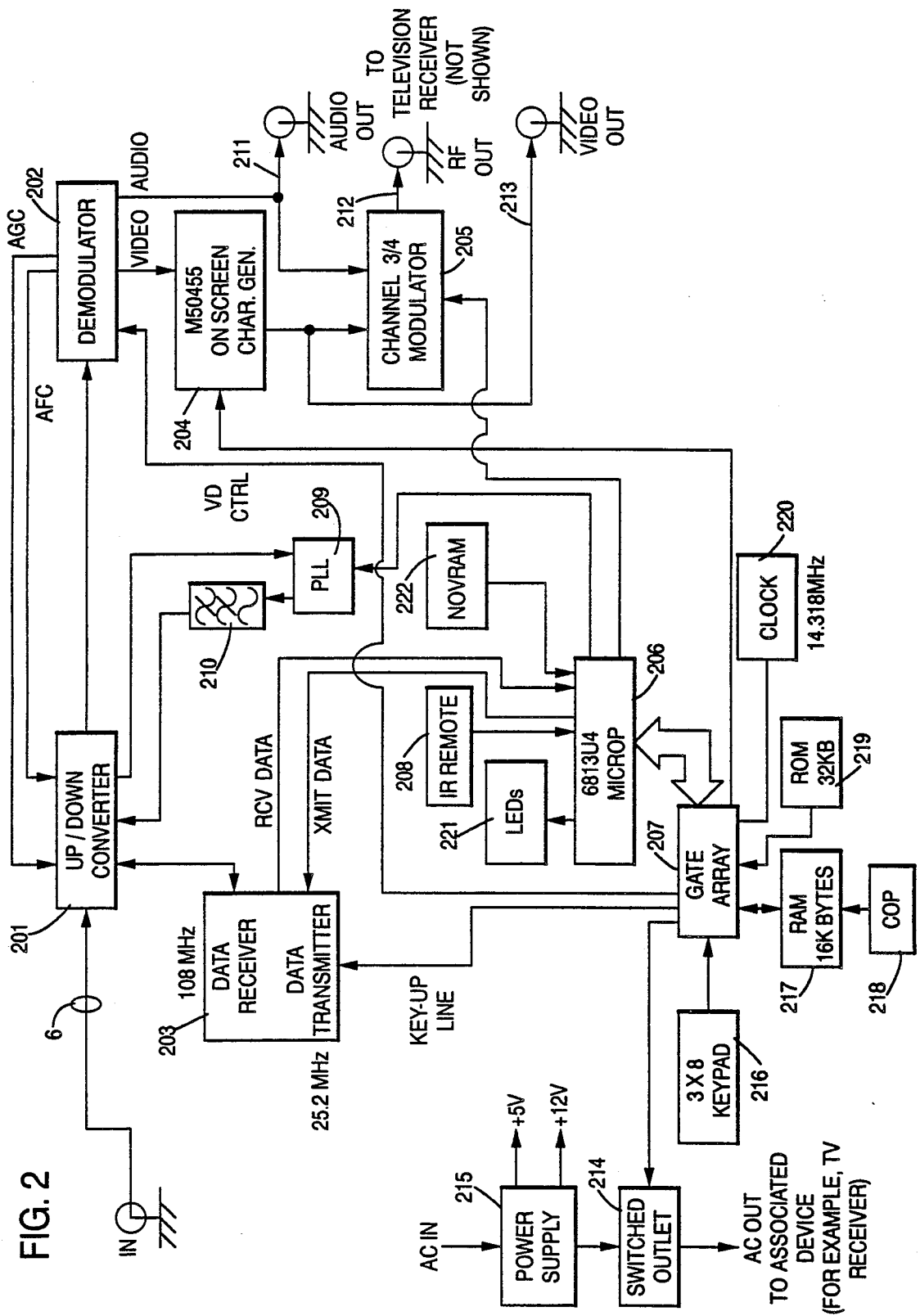
FIG. 2 is a block schematic diagram of an interactive terminal in accordance with the present invention.

FIG. 2 illustrates a two-way interactive terminal according to the present invention. The terminal is coupled via distribution cable 6 to video modulator 5, addressable transmitter/receiver 10, and locally generated video modulator 11, if provided, as shown in FIG. 1.

In particular, a two-way interactive terminal according to the present invention includes an up/down converter 201 for converting channels received over distribution cable 6 for display at an associated television receiver (not shown) or for transmitting data modulated to 25 megahertz by data transmitter 203 for transmission over distribution cable 6. Up/down converter 201 passes data on the separate data carrier at 108 megahertz for demodulation and reception at data receiver 203. Received television entertainment signals are provided by up/down converter 201 to demodulator 202 which also provides automatic frequency control and gain control of up/down converter 201. Demodulator 202 provides video via on-screen character generator 204 to channel ¾ modulator 205. In this manner, on-screen characters may appear superimposed upon an incoming video signal or displayed in the form of a teletext screen, for example, text on a colored background. Also at demodulator 202 the baseband audio channel is transmitted to audio output 211 or via channel modulator 205 to the television receiver at radio frequency. In addition, a baseband video output 213 may be provided from on-screen character generator 204 at video output jack 213.

Further details on the implementation of either background audio or video or both to accompany teletext screens generated at character generator 204 are found in U.S. application Ser. No. 07/340,967 filed concurrently herewith and previously incorporated herein by reference.

The interactive terminal of the present invention further includes a processor 206 for controlling data transmission and reception at data receiver/transmitter 203. Processor 206 also controls character generation at character generator 204 via gate array 207. Processor 206 also controls via gate array 207 a key pad 216 which may be directly coupled to the gate array or coupled via infrared or other remote control transmission link receiver 208. Random access memory (RAM) 217, provided with backup power by capacitor 218, stores character screen commands, downloaded feature data and other data received over the data transmission link via data receiver 203 from the system manager responsive to processor 206 control. The processor 206 also has access to a nonvolatile random access memory 222 and access via gate array 207 to an outboard read only memory (ROM) 219. Processor 206 receives remote control key commands from a remote control key pad via infrared or other remote control transmission receiver 208. Processor 206 may also control the operation of a phase lock loop 209 and bandpass filter 210 for controlling operation of the up/down converter 201.

Power is supplied via an alternating current input to power supply 215 which provides, for example, a plus 5 volt and a plus 12 volt DC input to the various components of the terminal requiring such power. Furthermore, the alternating current power input to power supply 215 may be provided via a controlled switched outlet 214 to an associated device such as the television receiver associated with the terminal. The state of the switched outlet 214 is controlled via gate array 207 by processor 206. For example, the switched outlet 214 may continuously provide power to its associated device or provide power only when an "on" button of key pad 216 or a remote control key pad is set to an on condition.

Values inside of boxes or associated with boxes are exemplary of memory sizes, clock rates, or component types. For example, clock 220 for clocking the microprocessor operation may operate at 14.318 megahertz. The clock signal is divided by gate array 207 for operation of the microprocessor 206 which may be a Motorola MC 6803U4 or for clocking other processes of the terminal. The on-screen character generator 204, for example, may be a Mitsubishi M50455 component. RAM 217 may comprise 16 kilobytes of memory and ROM 219 may comprise 32 kilobytes of memory.

In addition to character generation and screen display, LEDs 221 may, for example, indicate at least a power on condition or, additionally, an alternative display of tuned channel number or other data which may be displayed on a screen.

Figure 3A:
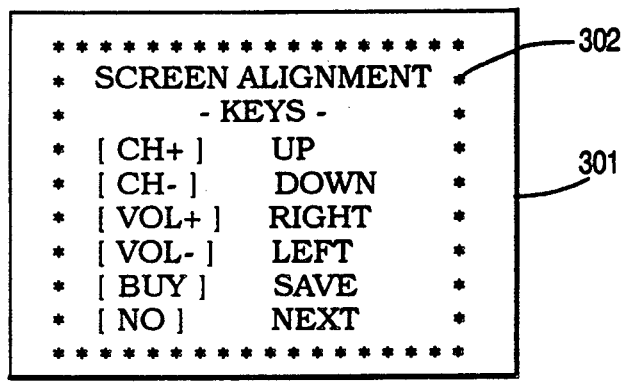
FIGS. 3(a)–3(d) are collections of four exemplary screens, three of which according to FIG. 3(a), (b) and (c) are for display on a television receiver associated with the terminal of FIG. 2 during an automatic installation mode of operation of the terminal and the fourth, according to FIG. 3(d), is for display during a terminal maintenance mode.
Figure 3B:
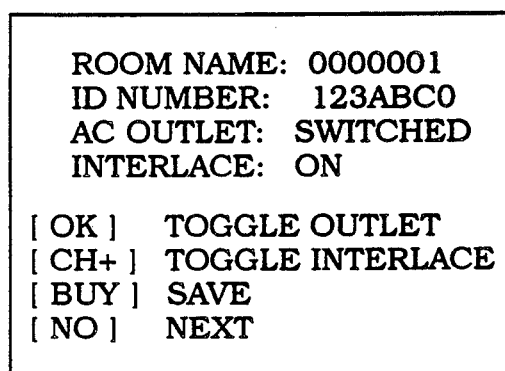
Figure 3C:
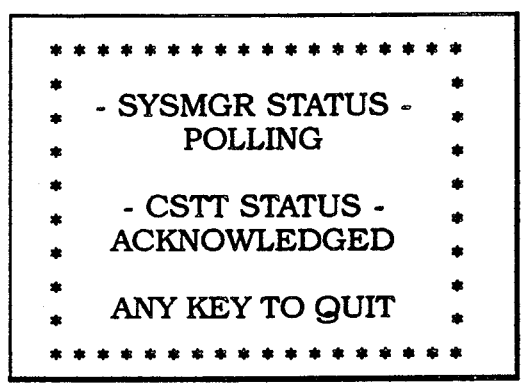
Figure 3D:
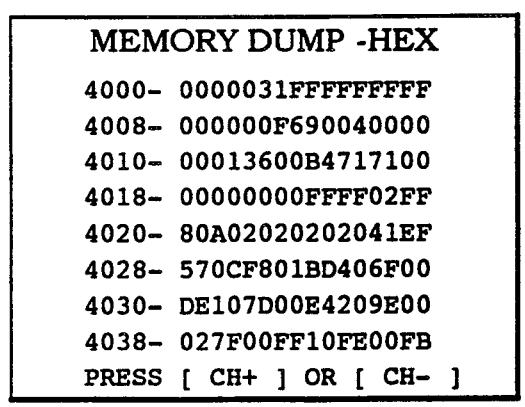
Figure 4:
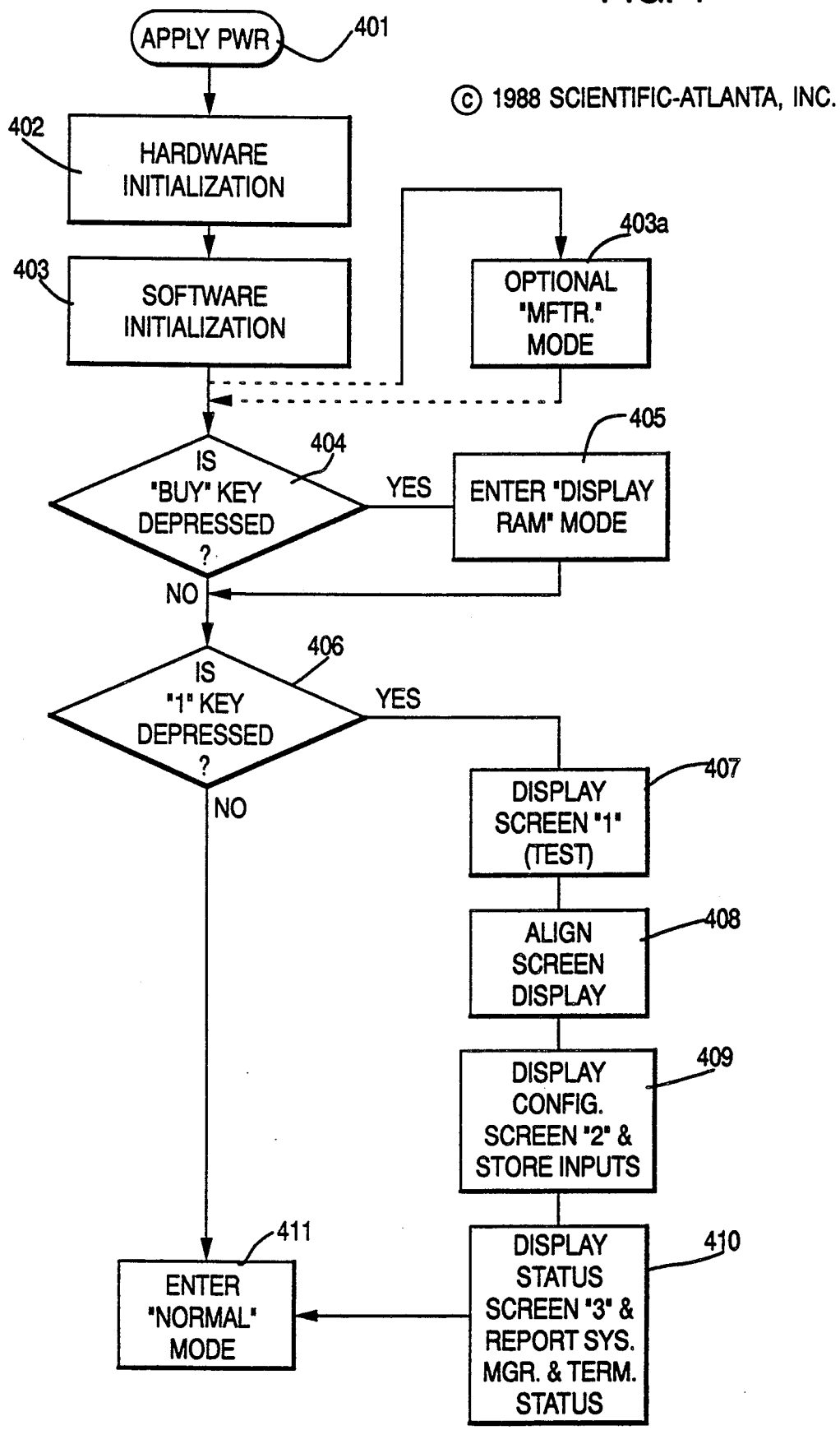
FIG. 4 is a flowchart of an algorithm of terminal software for accomplishing an automatic installation mode of operation or similarly implemented manufacturing or maintenance modes of operation.

Referring now to FIGS. 3(a)-3(d) and 4, the operation of the terminal of FIG. 2 will be described particularly with reference to the flowchart provided in FIG. 4. Copyright protection is asserted for each of screens FIGS. 3(a)-3(d) and for the flowcharts of FIG. 4. When the user of the terminal or a terminal installer applies power to the power supply 215 of FIG. 2 as indicated at step 401 of FIG. 4, processor 206 begins initialization of various hardware components of the terminal. The hardware initialization routines of step 402 may be any of the initialization routines applied in the art of terminal initialization, such as those applied in data terminal initialization. Processor 206 checks the proper operation and communication and control of components of the terminal such as data transmitter and receiver 203, gate array 207, on-screen character generator 204, key pad 216, and infrared remote control receiver 208. At step 403, the software may perform self-diagnostic routines well known in the art so as to verify proper software operation. Control may then pass to step 403a and the processor may enter an optional manufacturing or factory testing mode which will be discussed below. The processor may also enter a maintenance or display RAM mode of operation indicated at steps 404–405, which will also be discussed below. The mode of operation is dependent on the particular depression of a predetermined key of keyboard 216 or the receipt of data entered via remote control receiver 208 within a predetermined period of time after the application of power at step 401. The predetermined period of time may, for example, be the time from the application of power at step 401 to the time step 406 is reached and so it may appear to the user as if the application of power and the display of a first installation mode screen are substantially simultaneous, i.e., within approximately one second of each other. The actuation of the "1" key, for example, is shown at step 406. If the "1" key has been depressed within a predetermined time after the application of power at step 401, a first display screen "1" is generated at step 407 by on-screen character generator 204.

Display screen "1" is a test screen shown in FIG. 3(a). This display screen as well as the display screen of FIGS. 3(b) and 3(c), actuated at steps 409 and 410, respectively, are stored in either read only memory 219 or nonvolatile RAM 222. Consequently, these screens are not dependent upon the System Manager of FIG. 1 in any way. Because the entry into an installation mode is dependent on two normally unperformed tasks such as plugging in power and the practically simultaneous depression of a particular key, the installation mode is protected against inadvertent actuation.

Alternatively, step 406 may be supplemented by a decision box (not shown) as to whether step 401 represents the first application of power. If yes, then control passes to step 407. If no, then a step such as existing step 406 requiring a "1" key depression is entered. Such an entry into the installation mode may facilitate installation without jeopardizing security as such a supplemental box would typically only be entered once in the life of a terminal.

FIG. 3(a) shows a first display screen for alignment of the display of an associated television receiver. Since all television receivers do not handle the display of teletext screens in the same way, screen alignment is often necessary. According to FIG. 3(a), outer perimeter 301 represents the boundaries of a screen display of the associated television receiver. A box of asterisks 302 represents the boundaries of the test screen for testing alignment. A terminal user or installer follows the commands provided by test screen 302 to effectuate proper screen alignment. Processor 206 may scan key pad 216 or receive input commands entered via infrared remote receiver 208. Processor 206 will ignore any inputs other than those depicted in FIG. 3(a). For example, to align the screen display up or down, the user or installer will depress the channel increment or the channel decrement key respectively. To align the screen display to the right or to the left, the user or installer will depress either the volume increase or the volume decrease key respectively. To save the particular screen alignment selected, the user or installer depresses a "BUY" and the next screen is displayed. If the "NO" key is depressed before the "BUY" key, the previous screen alignment or default screen alignment setting will be saved. Actuating the "NO" key takes the user to the next screen shown in FIG. 3(b). Step 408 of the flowchart of FIG. 4 represents screen alignment as described above whereby either a default or a previously saved setting of screen alignment or a newly input screen alignment is saved in terminal memory. Optionally, a time out procedure may be provided whereby, if no action is taken, either the installation mode is quit or the next screen is displayed.

At step 409, a second of terminal configuration is displayed, screen 2. Screen 2 is shown in FIG. 3(b). According to FIG. 3(b), a room name is requested as well as instructions from the user or installer as to whether the switched AC outlet 214 should be switched or placed in a permanently on condition. "Interlace:" is a request for input from the user or the installer as to whether teletext screens should be interlaced or non-interlaced. While non-interlaced is preferred, excessive screen bounce exhibited by the television receiver may require the display to be interlaced. However, non-interlaced screens generally exhibit little, if any, screen bounce compared with interlaced screen display.

The screen of FIG. 3(b) also may show the permanent unique identification number (or long address) of the terminal, in this example, 123ABCO. If a user is to install a terminal and to secure the terminal's identity from piracy by the user of premium services, it may not be appropriate to display the unique terminal identification number. Also, in a user installation environment, the room name may be insufficient to uniquely identify the user's location and other information must be entered related to the location of the terminal. For example, in such a scenario, the user's name, address and credit information, i.e., credit card data, may be requested by this screen. Furthermore, the "interlace request" may require explanation to an unsophisticated user.

It should be noted that by assigning new functions to existing keys CH+, CH−, Vol+, Vol−, BUY, etc., the present invention permits programmable assignment of functions to keys which may have little or no relationship to the key labeling. Furthermore, by reinforcing the assigned key function by means of a screen display, a user or installer may feel comfortable with their selection of a particular key for performing a non-indicated function. In other words, the combination of screen display and programmable keys creates a user friendly interface between the user or the installer and the terminal.

Returning now to FIG. 3(b), "Room Name:" requests the entry of a non-zero room identifier. The System Manager may be programmed to refuse acceptance of a room name comprising all zeros. Consequently, a terminal reporting a room name of all zeros will be denied entry into the system. The room name is entered by depressing numeric keys one at a time until the number is shifted into the seven indicated positions from right to left. Actuating the "BUY" key will save the displayed terminal configuration and actuate display of the next screen. Actuating the "NO" key will preserve the existing status and enter the next screen, FIG. 3(c). If an invalid name has been entered, the "BUY" key will be ignored. A time out, if provided, will actuate the next screen or quit the installation mode.

Referring now to FIG. 3(c), a system manager, according to FIG. 1, may be in the process of polling a terminal, i.e. requesting or accepting transmissions from the terminal or configuring the terminal by transmitting, for example, channel assignments, screen generation commands, and/or features to the terminal for storage in memory. The "Sysmgr Status", then, is either "POLLING" or "CONFIGURING" when the system manager is active. If the system manager is down or is not communicating with the terminal for any reason, the "Sysmgr Status" is indicated as "INACTIVE." If either "POLLING" or "CONFIGURING" are displayed, the user or installer at least knows that the system manager is transmitting to the terminal.

The status of the terminal is either UNCONFIRMED or ACKNOWLEDGED. Typically, in a global command related to initial system entry, a system manager requests a newly installed terminal to transmit at least its identification and location name. If the system manager recognizes a previously unconfigured terminal or a new name not previously entered in the system, the system manager enters the new name into its memory along with configured features such as the status of the switched power outlet 214.

The third screen according to FIG. 3(c) is only to provide a visual indication to the user or the installer of system manager and terminal status. The processor 206 and system manager will interact, upon initial installation, regardless of whether the third screen is displayed until the terminal is entered into the system and the terminal entry is acknowledged if a valid room name or related data has been entered. The actuation of any keyboard key will quit the installation mode.

In an alternative embodiment, all three screens may comprise one screen provided the screen does not become too "busy" to be user friendly. For example, with the advent of high definition television and wider screens, it may be possible to condense the number of screens employed for an installation mode of terminal operation.

In an alternative embodiment, a time out may be associated with each screen such that, if no keys are depressed, the installation mode is eventually quit and no actions taken if no room name is entered.

Referring again to FIG. 4, at step 404, it may be possible to implement a "maintenance mode" of operation comprising steps 404 and 405, for example, if desired, in a similar manner to the implementation of the "installation mode" of steps 406–410. Instead of depressing the "1" key within a predetermined period of time, a "BUY" key actuation may be recognized within a predetermined period of time after the application of power and at some point after software initialization has at least begun at box 403. If the "BUY" key is depressed within a predetermined period of time since power application, a screen such as the screen of FIG. 3(d) may be displayed for showing memory status. One can page through the memory by depressing CH+ or CH− and may toggle from hexadecimal to ASCII format by depressing another key, for example, the "OK" key.

Furthermore, in a manner similar to the mode of access described by U.S. Pat. No. 4,792,972 which issued Dec. 20, 1988, and in accordance with step 403a, a factory testing or "mftr" mode of operation may be entered by the entry of a special code via the infrared remote link receiver 208. In practice, step 403a need not be positioned as shown since there is no required relationship between step 403a, initialization and the application of power. It may be entered any time the special code is received, for example, during a normal mode of operation according to step 411. This special code, for example, may not be one that is generatable by either the terminal keypad 216 or an infrared transmitter normally provided with the terminal. In this way, only factory personnel may enter the factory mode unless, for example, an installer or user is provided with a special transmitter which can generate the special code.

Figure 5:
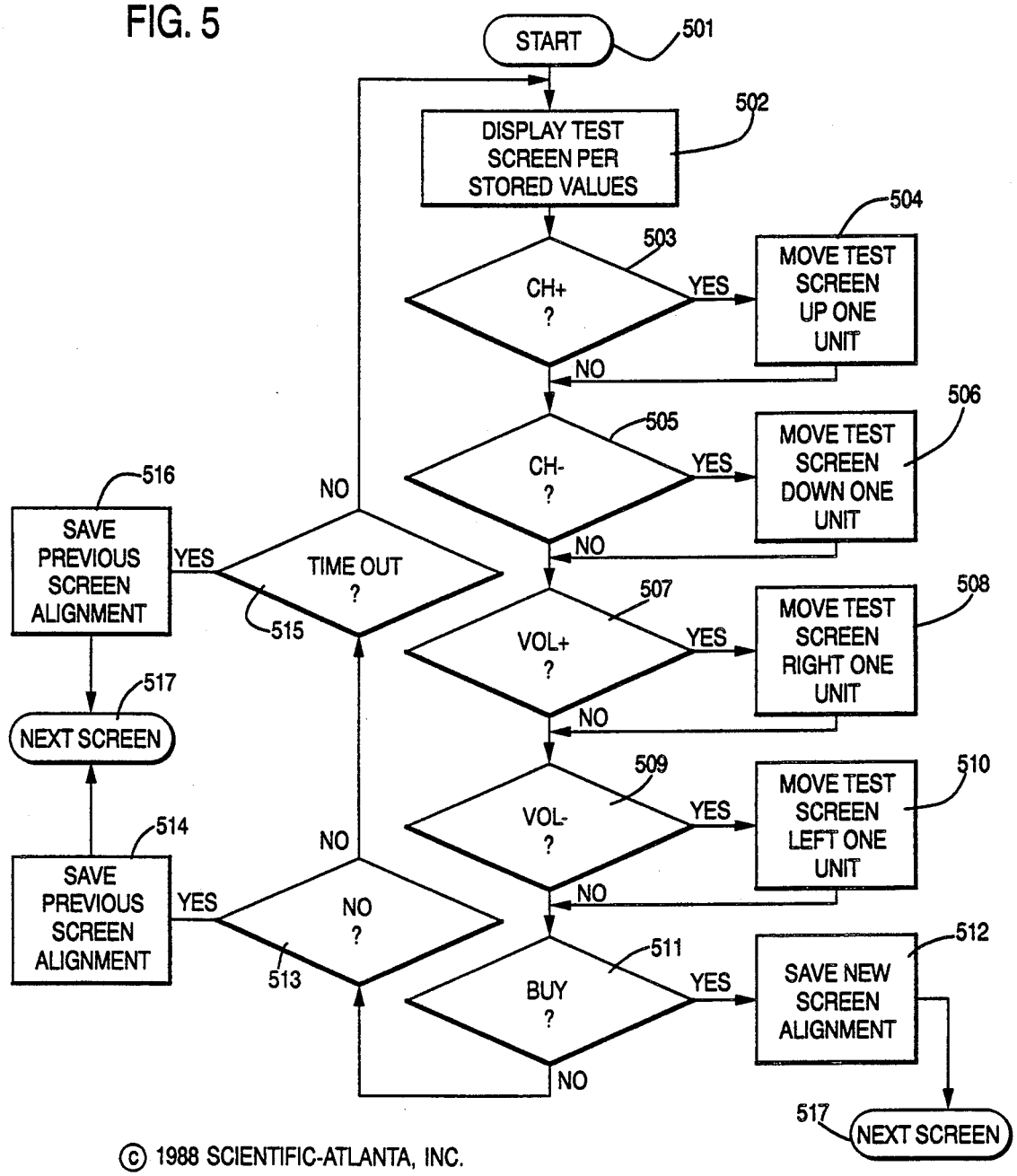
FIG. 5 is a detailed flowchart of processor operation related to screen alignment.
Figure 6:
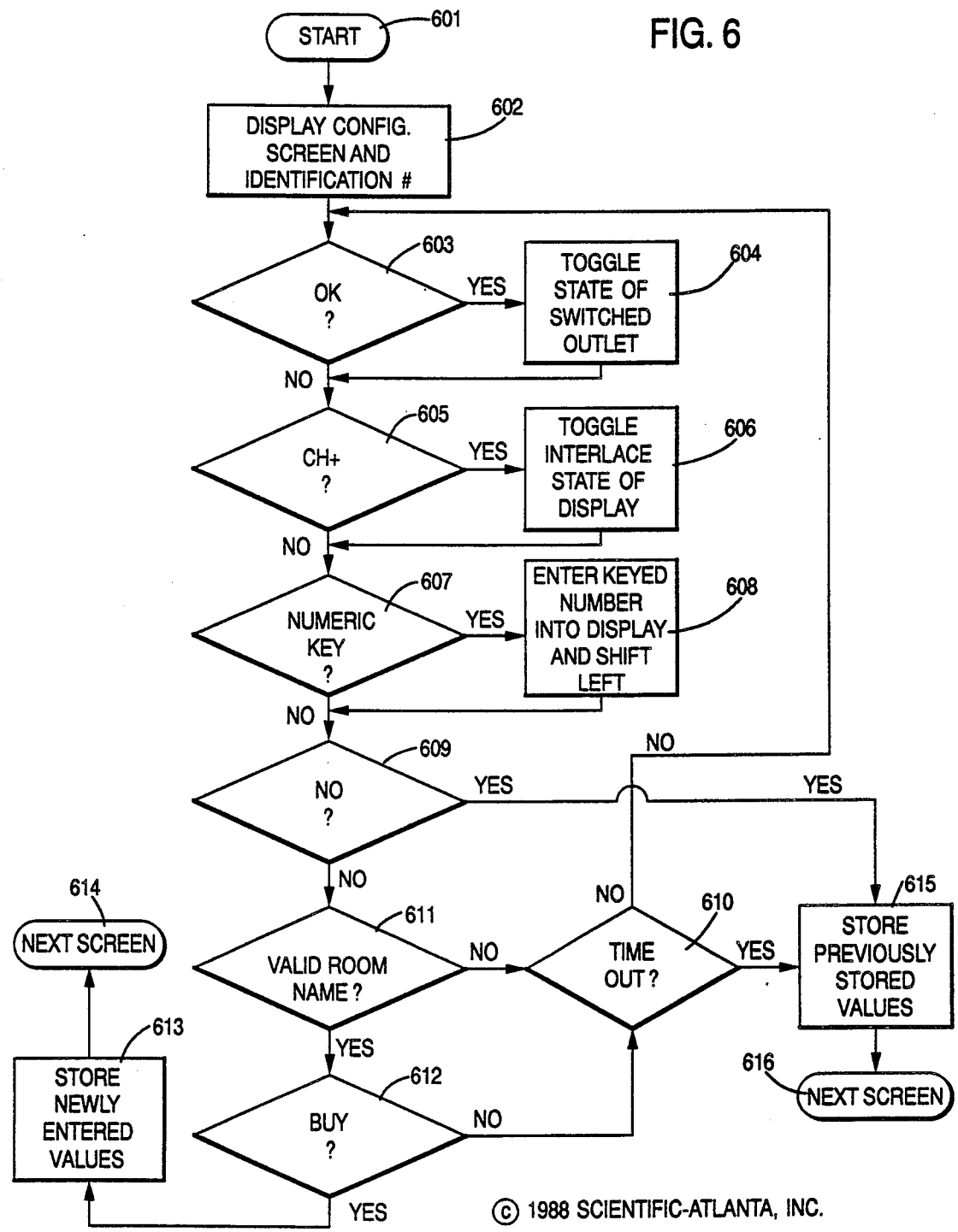
FIG. 6 is a detailed flowchart of processor operation related to terminal configuration.
Figure 7:
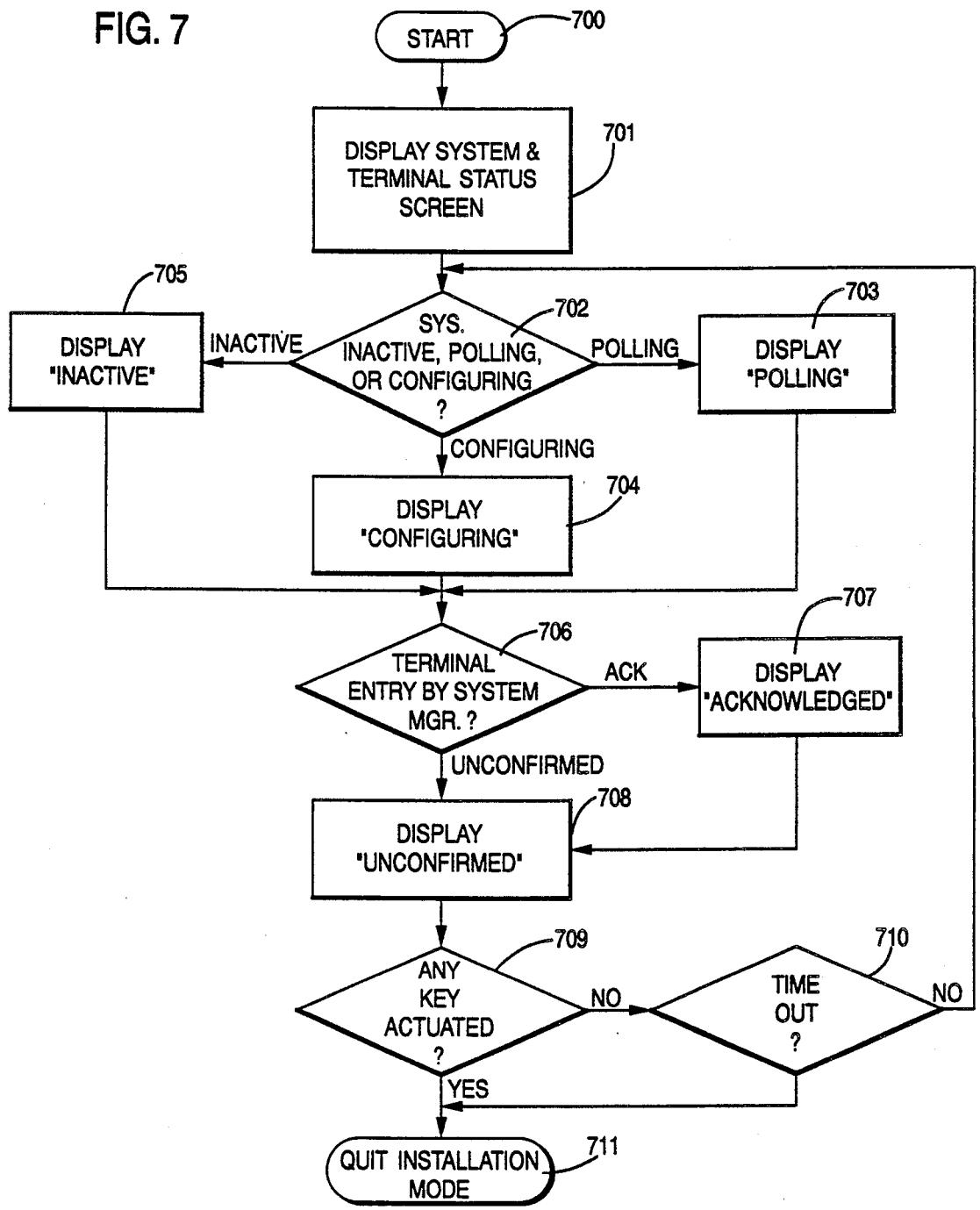
FIG. 7 is detailed flowchart of processor operation related to system status and acknowledgement of system entry.

Referring now to FIGS. 5–7, the installation mode of operation of a terminal according to the present invention will be demonstrated in still greater detail. Copyright protection is asserted for each of flowcharts FIGS. 5–7. FIG. 5 relates to steps 407 and 408 of FIG. 4 and test screen "1" of FIG. 3(a). Step 501 is entered from step 406 of FIG. 4 after a predetermined period of time has lapsed until the actuation of a "1" key measured by the duration of accomplishing initialization routines or directly after initialization if this is the first application of power to the terminal. Other means for accomplishing a predetermined period of time may include the use of clock 220 to obtain a predetermined count since power application. At step 502, test screen "1" is displayed in a position according to a default screen alignment position or a previously stored position. Steps 503–510 relate to the incremental movement of the test screen by one unit, for example, one horizontal or vertical line, up or down, to the right or to the left.

If, at step 511, the "buy" key is depressed, then, the new screen alignment is stored. If not, and the "No" key is actuated at step 513, the previous screen alignment is stored at step 514. If a certain period of time has elapsed with no activity at step 515, the previous screen may be stored at step 516. The next screen, screen "2" of FIG. 3(b), is entered at step 517 having saved either the previous screen alignment or a newly entered screen alignment.

Referring now to FIG. 6, step 601 is entered from step 517 of FIG. 5. The screen according to FIG. 3(b) is displayed at step 602 and, optionally, so is the terminal identification number. Steps 603–606 relate to configuring the status of the switched outlet 214 and to the interlaced or non-interlaced character of the display.

Any number key at step 607 will actuate a shifting to the left of numbers already entered in the room name field of FIG. 3(b). If a credit card number or other personal information is required of a user, then, another key may toggle to numeric entry of a credit card choice and then to a credit card number or to entry of any other number or item selection according to other screens (not shown). The depicted keyboard 216 is not equipped with alphabetic keys and comprises only eighteen or twenty-two keys of the required twenty-six. However, means are known for alphabetic entry of characters from a limited capacity keyboard which may be employed or the keyboard may be expanded by four keys if alphabetic input is required.

If a non-zero room name is entered at step 607, then, system entry can be obtained for a terminal via a path including steps 609, 611, 612, 613 and 614. Otherwise, if the room name is invalid at step 611 and there has been no time-out at step 610, the terminal will remain in a loop in which it will refuse to recognize a "BUY" key. If the "NO" key is actuated at step 609 or if there has occurred a time-out at step 610, previously entered values are stored and the next screen extended at step 616. If, on the other hand, a valid room name has been entered at step 611 and the "Buy" key has been actuated at step 612, then the room name and the terminal configuration are stored at step 613 and the next screen entered at step 614.

Referring now to FIG. 7, screen 3 according to FIG. 3(c) is displayed showing the current status of the system manager and the terminal. Steps 702–705 relate to display of the current status of the system manager. Steps 706–708 relate to display of the current status of entry of the terminal into the system. Any key actuation at step 709 actuates a quitting of the installation mode at step 711 or a time-out may be implemented according to step 710.

Figure 8:
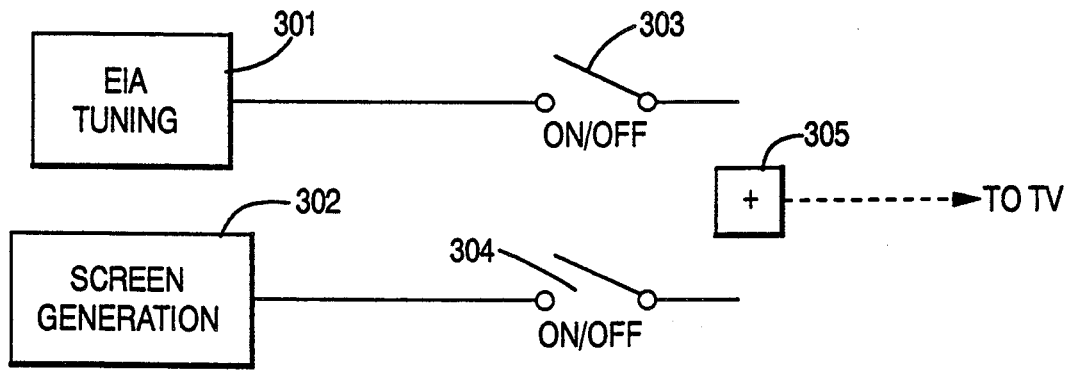
FIG. 8 is a simplified schematic diagram of the terminal of FIG. 2.

Referring to FIG. 8, the elements of the terminal of FIG. 2 pertinent to the present invention are shown in simplified schematic form. Up/down converter 201 and demodulator 202 are simply represented as an EIA (Electronic Industries Association) channel tuning circuit 301. The on-screen generator 204 is simply represented as screen generation circuit 302. The somewhat complicated control of tuning shown in FIG. 2 is simply shown as first on/off switch 303 of FIG. 8. Similarly, the presence or absence of teletext output of generator 204 is represented as second on/off switch 304.

Referring briefly to FIG. 2, video output of demodulator 202 is provided via generator 204 for display. Consequently, generator 204 also provides a video signal summation simply represented by summation circuit 305. Also, gate array 207 controls demodulator 202 in such a way that audio is switchably provided via lead 211 or RF signal 212 depending on whether background audio is enabled or not according to the present invention.

The outputs to the TV can be EIA tuning alone, screen generation alone, or a mixing of screen generation and EIA tuning. For this last option the background sound for the particular screen is the corresponding audio for the EIA tuned channel. To view the EIA video, the screen attributes stored in terminal memory for an associated template must be set to "On Screen."

The background audio/video can be configured as any EIA channel in the range of channels provided over the cable television facility. The audio can be muted independently. If no volume exists for a particular screen, the mute, volume up and volume down keys of a terminal keyboard have no effect on the volume. Volume bars may be displayed, however. If there is no EIA channel configured, audio is automatically muted. In addition, if the screen attribute is On Screen, the last tuned EIA channel will appear as the background video in the absence of tuning frequency data associated with the screen.

There exist two special EIA channel values for the handling of pay-per-view premium channel services. Since there exist, for example, a lesser number of individually configurable premium channels and only one set of screens associated with purchasing premium channels, the need arises for special handling of background channels. To configure the alternate video channel for the particular premium as the background video channel, one channel may be predetermined as the EIA channel. For the premium channel itself as the background, a second premium channel may be used. If these values are used while not on a premium channel, the first tuned EIA channel will appear as the background video and the audio will be muted. Scrambling as indicated above is optional and will only be done for the second premium channel background.

Details of teletext screen design at a system manager location and of screen priority of a terminal memory are described in U.S. application Ser. No. 07/342,987 filed concurrently herewith and incorporated herein by reference. Screen templates are designed and stored in system manager memory by screen number. A template file identified by name and associated with a screen determines what actions the terminal should take in response to the actuation of keys of a terminal keyboard. More importantly, associated with the screen in screen memory is an EIA channel frequency to which the terminal should tune to obtain background audio/video. Another memory flag indicates whether background audio is enabled or not. Further, in an attribute list is included information as to whether "on-screen" status is flagged indicating that the channel indicated by the tuning data or the last-tuned EIA channel appears as background as explained above.

A user may use their handheld remote control or terminal keyboard to adjust audio volume by actuating appropriate volume keys. At the same time, and according to the key template for the screen, other keys may have different functions depending on their description on the screen, i.e., buy or OK keys.

Screens discussed herein are categorized into special, feature start and other screens. Special screens, such as "standby" are used so frequently that they have the highest priority on terminal screen memory. Feature start screens are the first screens associated with a particular feature such as wake-up, checkout, room service and such. "Other" screens are all other non-special and non-feature start screens. These in turn are swapped in and out of terminal memory by category and an assigned priority level according to an algorithm described in U.S. application Ser. No. 07/342,987.

Figure 9A:
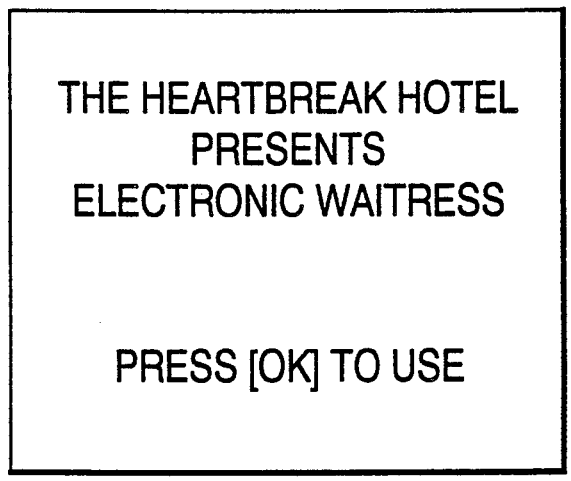
FIGS. 9(a), 9(b) are feature start screen in accordance with the present invention.
Figure 9B:
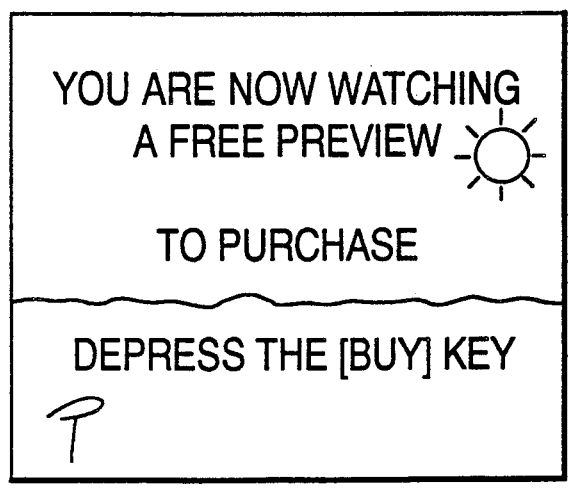

The user may decide to actuate pay-per-view premium channel service. Referring to FIGS. 9(a), 9(b), a first (feature start) instruction screen may be denoted 600. This screen will also have an associated background EIA channel and, if background audio is enabled, background program audio. The preview screen may be timed so that after the predetermined time period passes, the user will thereafter be denied having the program appear in the background. A second predetermined period of time may be associated with a teletext screen that is longer or shorter than the preview time. For example, if longer, the screen will urge the viewer to press the buy key after the preview is over. If shorter, a series of screens may be displayed during the preview time, the series of screens providing more detailed instructions than could appear in just one screen.

In order to identify each terminal, an address is associated with each terminal or in-room box (IRB). In the discussion below, the term In-Room Box (IRB) or box will be used to denote a terminal 7, 8, or 9 according to FIG. 1 or FIG. 2. There are two types of IRB addresses: a long address and a short address. Since the IRB contains no DIP switches for setting the long address, the long address is set at the time of manufacture and is generally not altered "in the field". Each box manufactured includes a unique long address. The long address consists of three bytes and has a permissible range of 1 to 8,388,607 (0x7fffff), i.e. $2^{23}-1$. The notation "0x" will be used throughout the specification to denote hexadecimal notation. To minimize communications overhead, a short address may be configured by the system manager. The short address is treated identically to the long address. The short address is site specific and is stored so as to prevent its erasure due to power failure, etc. The short addresses have a permissible range of 1 to 32,767 (0x7fff), i.e. $2^{15}-1$.

To differentiate between the long and short address formats, the first bit of the first address byte is SET for long addresses and CLEARED for short addresses. Alternatively, the first bit of the first address byte may be SET for short addresses and CLEARED for long addresses. Utilizing such a protocol, there is no interaction between the short and long address formats.

It should be emphasized that the long and short address ranges listed above are representative of one embodiment of the present invention and the invention should not be limited in this respect.

The long address is stored in non-volatile memory (NVM) so as not to be erased. In a preferred embodiment, several methods are provided to determine the long address of a particular IRB. First, as described above, when the second installation mode screen is displayed, the ID number field may display the long address. (See FIG. 3(b)). Second, the system manager may determine the long address by issuing a "report long address" command to the IRB. This command will prompt a response from an addressed IRB regardless of the IRB address to which the command is sent. In a preferred embodiment the IRB will return four bytes, the first byte being zero.

A global address is a fixed address associated with each IRB. In a preferred embodiment, the global address is fixed at 0x7ffc. All units recognize a global address to aid in sending system-wide commands. In a preferred embodiment no response is normally given to commands sent to the global address. The global address is intended for use, for example, in handling schedule changes, sending time of day transactions, sending common screens, etc. If a command is issued to the global address, an internal flag is set inside the IRB to indicate that a global type command has been received. The flag may be used by the system manager to verify receipt of global configuration commands and may subsequently be cleared.

A secondary or group address is also issued by the system manager. The secondary address may also be used to issue commands to the box and is handled by the IRB as a second global address. In order to maximize system performance, more than one IRB may share the same secondary address. This permits the control of multiple IRBs with a single transmit cycle.

The normal mode of IRB operation is as a conventional set-top terminal. For example, the terminal may be a 40 channel set-top terminal. These channels may be in any of the following states: free, disabled, premium purchased, or premium unpurchased.

The software associated with the IRB is capable of configuring the location of or "mapping" all channels. Thus, channel 2 from the system headend may be selected by any channel number mapped to channel 2 by the system manager. Character generator screens may also be assigned to any channel number. Each character screen has a unique screen number different from an assigned channel number. For example, screen numbers may be assigned in the range 128–1023 which is higher than the number of unique channel numbers. Mapping not only includes the capability to determine the channel number that a screen or channel will come up on but also provides the capability to disable a particular channel number. These capabilities may be handled globally or individually. This permits the following features, as well as others, to be implemented: (1) configuration of the system to the channel numbers desired, (2) overrides, although a separate override list may be used, (3) individual set-top control of video conferences, (4) disabling of channels, (5) multiple occurrences of the same channel, and (6) access to character generator screens.

If the channel selected by a viewer is in the free mode, that channel is tuned and viewed directly. For channels in the free mode, the IRB operates as a standard set-top terminal as is known in the art.

If a disabled or illegal channel is selected by directly entering such a channel number into the numeric keypad, the IRB remains in its current mode. The display may show the disabled channel number for a predetermined period of time, two seconds for example, before reverting to the previous display. If the disabled or illegal channel is selected by using the channel up [CH+] or channel down [CH−] functions, the channel will be skipped. The next available channel will be tuned.

Each IRB is preferably capable of supporting three barker messages: a first for use before the preview, a second for use after the preview, and a third for use if all the previews for a terminal are exhausted. That is, each terminal may have a current count of exhausted previews stored in its memory. The text of the messages and the message durations are programmable by the system manager. In a preferred embodiment, all premium channels utilize the same message and message duration, although the invention is not limited in this respect. The title and price of a premium program may be substituted into barker screens for each separate channel, however. Additionally, the audio from the premium channel may be disabled. In a preferred embodiment, twelve premium channels may be supported, although the invention is not limited in this respect.

When a premium channel which has not been purchased is selected, the display shows the selected channel number. A special text screen is displayed on the television. This is the 'Barker 1' screen. The 'Barker 1' screen is preferably displayed for a first predetermined period of time such as 0 to 60 seconds or until a predetermined keystroke is performed. When the 'Barker 1' screen is exited, the selected channel is tuned. The tuned channel will remain on for a second predetermined period of preview time such as 0 to 248 seconds or until a predetermined keystroke is performed. After leaving the tuned channel, a 'Barker 2' screen is displayed for a third predetermined period of time such as 0 to 56 seconds. Alternatively, the 'Barker 2' screen may be displayed indefinitely.

A limited number of previews is allowed for each premium channel. A 'set preview counter' command may be issued by the system manager. The command is used to increment the number of previews allowed for all premium shows up to but not exceeding a predetermined maximum number of previews. If all previews on a particular channel are exhausted, a 'Barker 3' screen will be invoked. This screen would, for example, inform the viewer that his or her previews have been used. The third barker screen has the same time duration as the second barker screen in a preferred embodiment.

If the viewer or guest desires to purchase the premium program he or she may do so during the second or third barker screens as described in detail below. The configuration parameters may also allow purchases during the preview itself, if desired. Premium purchased channels are treated as free channels and tuned directly. If a premium channel is not purchased and the preview times out, the IRB may, for example, perform a channel up [CH+] command. Alternatively, the IRB may perform a channel down [CH−] command or may be tuned to a particular, predetermined channel. Setting the second and third screens to not time out will prevent the automatic channel up or channel down.

As described above, the IRB of the present invention lends itself to data display functions. In a preferred embodiment, the IRB includes sufficient memory to hold at least ten screens of text data (preferably, forty-seven) including the barker channels described above. Any information which can be displayed in a text format that fits on the screen may be presented. When a channel number is selected by keyboard entry that corresponds to a data screen, the normal tuner output is disabled and the text generating circuitry is activated. A screen of text data is displayed. While text data is being displayed, the IRB keys may be programmed to behave in different manners. A keystroke may, for example, cause new page of data to be displayed and in turn reprogram the keys to a new set of actions corresponding to the new screen. This is useful in implementing "menu"-type displays. A keystroke or series of keystrokes may be saved for subsequent reporting to the system manager. Optionally, the digit keys may be echoed on the screen. This is intended for functions needing verification from the system manager. By combining these actions, the full range of user friendly system services may be implemented. All of these services may be accessed either through a menu driven interface or directly by having specific unused channel numbers assigned to each function Furthermore, the terminal issues screen requests to the System Manager to obtain any screens missing from its memory which the room occupant may select. Consequently, by the time a room occupant makes a selection, the selected screen data may be already resident in terminal memory.

Screens are kept resident in the IRB whenever possible. The priority of screens within categories is predetermined by the system manager. If the requested function or data is not currently resident in IRB memory, a default screen will be displayed (such as "Please stand by . . . ") while the data is requested from the system manager. When the data is received, it will be displayed. A channel number or the channel up, down or no buttons may be used to abort this sequence.

In a preferred embodiment, the system manager is powered up into an entry screen. This screen does not contain any menu selections. Preferably, an operator will then be prompted for a password. When a valid password has been entered, the operator will be in the main menu. The menu screens seen by an operator will include only the features his or her password is allowed to access. The operator's console should be blanked after a predetermined time period of inactivity, for example, five minutes. The system should automatically return to the entry screen at this time.

Figure 10:
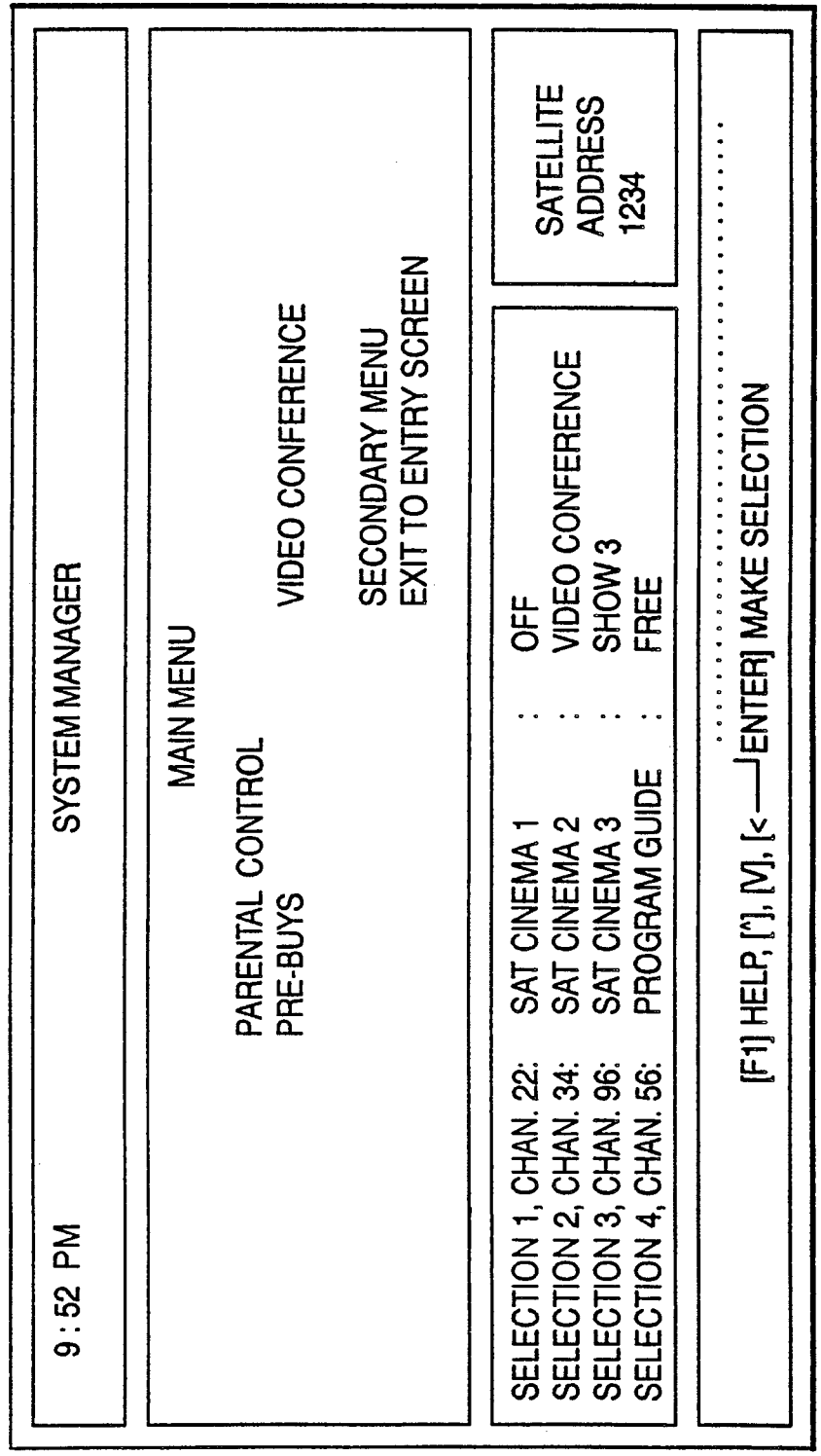
FIG. 10 illustrates a system manager menu screen.

FIG. 10 illustrates a menu screen. As noted above, the menu screen which is displayed is dependent on the current operator and his or her password. Other menu features may be added to the menu of FIG. 10, but are not necessary to an understanding of the present invention. If the operator wishes to execute a feature displayed on the menu, the selection is made by, for example, positioning the cursor appropriately.

If the operator wishes to execute parental control override in accordance with the present invention, such selection is made from the menu and a screen such as that of FIG. 11 is displayed. Rooms on parental control still receive free shows. The parental control feature of the present invention affects only premium shows. In order to disable a room, the "disable" feature is selected and the operator is prompted to enter a room name into the box provided. When the room name has been entered, the cursor jumps to the selection box and the operator may then enter the number of the premium selection(s) at the bottom of the screen to be overridden. When this is complete, the screen will be updated. "All" can be used as a valid selection box entry.

To permanently disable a room, the operator is prompted to enter a room name into the box provided, but only if his or her password is authorized to permanently disable a room. When the room name has been entered, the cursor jumps to the selection box and the operator may then enter the number of the premium selection(s) to be overridden. "All" may be used as a valid selection box entry. When this action is completed, the screen will be updated. Because of the transitory nature of hotel guests, parental overrides for rooms are typically removed each day at a particular time during a "night" test. The permanent parental control remains in effect even after a night test is run which removes all other rooms on parental control out of the buffer. The permanent parental control will remain in effect until a return to normal, described immediately below, is performed on the room. Typically, only a fixed number of permanent parental control overrides may be configured by the system manager, although the invention is not limited in this respect.

When returning a room to normal, the operator is prompted to enter a room name into the box provided. When this entry is complete, the cursor will jump over to the selection box and the operator then enters the number of the selection(s) to be returned to normal. When this is complete, the screen will be updated. The operator in a preferred embodiment will not be prompted for the selection if only one selection is on parental control for that room. "All" may be used as a valid selection box entry.

The result of the above-described system manager operations is that a set override bit command is issued by the system manager. The command is used to set and clear the override indicator for the given premium channel for the IRB at [short address/long address]. If the override indicator is set, the associated premium channel is disabled and is not viewable. As described below, if the override bit for the premium channel is set, an 'Override' screen, if configured is displayed when the premium channel is tuned. If no 'Override' screen is configured, the channel will be skipped. However, by configuring an 'Override' screen a room occupant is informed immediately of the reason a particular channel is not viewable. This reduces frustration of the occupant and facilitates resolution of problems which may arise since the reason the channel is not viewable is known.

The override, or parental control feature, may alternatively be implemented by a guest from within his room. The general procedure is as follows: the customer tunes to the specified channel, and enters the password that he or she has been given by the front desk upon checking in. The system manager checks the validity of the password. If the password is incorrect, an error screen is displayed to advise the customer to either try again or contact the front desk. If the password is ok, the customer is able to either enable or disable the desired premium channels. A screen is then displayed asking the customer to verify that the correct premium channels have either been enabled or disabled as appropriate, or to contact the front desk should any problems arise. The screens which may be used for implementation of this feature are illustrated in FIGS. 12(a)–12(g). The screens may either be stored at the IRB or at the system manager.

Figure 12A:
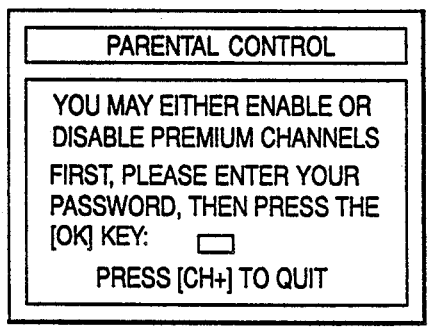
FIGS. 12(a)–12(g) illustrate a second embodiment of the override feature of the present invention.
Figure 12B:
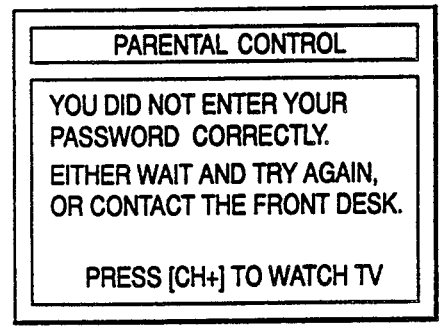
Figure 12C:
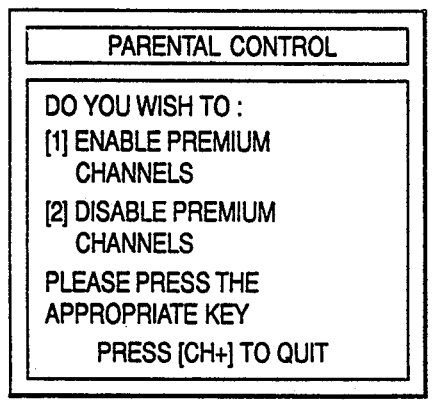
Figure 12D:
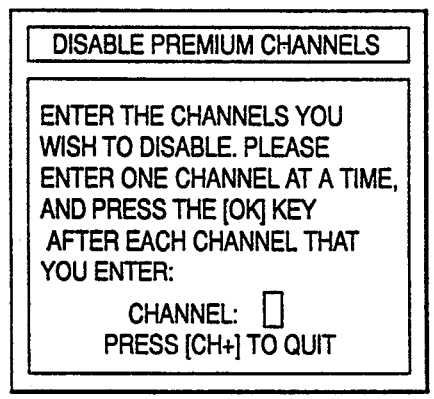
Figure 12E:
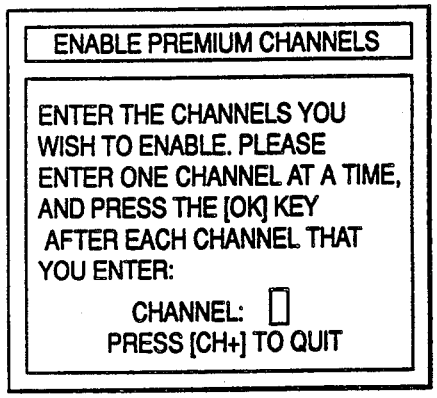

After tuning to the specific channel as designated by the system manager, the screen shown in FIG. 12(a) is displayed. The customer then enters a predetermined password and subsequently depresses the [ok] key. If the password is incorrect, the screen shown in FIG. 12(b) is displayed and the customer is prompted to try again or contact the front desk. The customer may depress the channel up [ch+] key to resume normal television viewing at this point. If the entered password is correct, the screen shown in FIG. 12(c) is displayed and the customer is prompted to depress an appropriate key for enabling or disabling premium channels. Depression of the [ch+] key during this screen display will quit the parental lock-out mode. If the customer desires to disable premium channels, the screen shown in FIG. 12(d) is displayed and the customer is prompted to enter the channels to be disabled. If the customer desires to enable premium channels, the screen shown in FIG.

12(e) is displayed and the customer is prompted to enter the channels to be enabled.

Figure 12F:
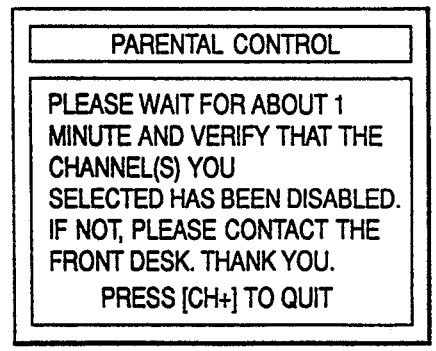
Figure 12G:
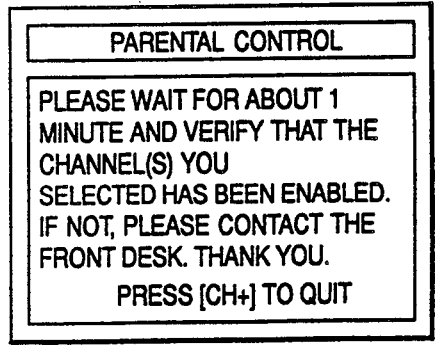

The screen shown in FIG. 12(f) is displayed after the customer has selected channels to be disabled and prompts the customer to wait for one minute and verify that the channel(s) the customer selected have been disabled. Likewise, if the customer has selected channels to be enabled, the screen shown in FIG. 12(g) is displayed. The customer is prompted to wait for one minute to verify that the channel(s) selected have been enabled. In both cases, the customer is prompted to contact the front desk should any problems occur.

It should be noted that variations may be made on this technique within the scope of the invention. For instance, a customer may only be permitted a predetermined number of attempts to key in a correct password before being locked out from further attempts to utilize the override function. After this predetermined number of tries, the customer may be inhibited from attempting to implement override for a predetermined period of time or alternatively, may have to contact the front desk to exercise such control.

A second feature of the present invention which may be entered from the main menu is pre-buys. An example of a screen which may appear on the operator's console to configure pre-buys is shown in FIG. 13. Prompts will be present if the screen of FIG. 13 must continue on another page. All rooms may be on the pre-buy list. If parental control override is applied, the override does not permit guests to see any programming on the overridden channels. When in premium mode, the guests will not receive the premium channel if their current credit is below the price of the movie.

When a premium purchase is made, the guest's credit is automatically reduced by the amount of the purchase. If the guest's credit is reduced to $0.00, he or she will be removed from the prebuy list automatically if the site is configured to be $0.00 credit limit by default. When the operator adds a room, the operator is first prompted for the room name. The operator is then prompted for the dollar amount which will include I for infinite (credit card customer). Deleting a room will require only that the room name be entered.

The result of the above-described system manager operations is that a set prebuy bit command is issued by the system manager. The command is used to set and clear the prebuy indicator for the given premium channel for the IRB at [short address/long address]. If the prebuy indicator is set, the associated premium channel is not viewable. A screen will be generated indicating to the room occupant why i.e. credit is not available. As described below if the prebuy bit is set, the 'Prebuy' screen if configured, will be displayed instead of the barker screens. If no 'Prebuy' screen is configured, the channel is skipped. If the prebuy bit is clear, the IRB will handle the premium scenario normally. Again by configuring a 'Prebuy', screen, a room occupant is informed immediately of the reason a particular channel is not viewable.

Another feature in accordance with the present invention is video conferencing. FIG. 14 is an example of a screen which may appear on the operator's console to configure a video conference. A video conference broadly refers to programming for limited viewer access. For example, a corporate board meeting in Chicago may be transmitted via satellite to a plurality of selected hotels in New York, Los Angeles, or Houston. Specific rooms in each hotel may be configured to tune the conference. When "Video Conference" is selected from the main menu, the system operator will enter the screen of FIG. 14 to edit the rooms for the conference. When selecting Add a Room or Delete a Room, the operator will be prompted to enter a room name inside the box provided. The database is updated with the new information.

The result of the above system manager operations is that a "set video conference bit" command is issued by the system manager. This command sets and clears the video conference indicator for the given premium channel of the IRB at [short address/long address]. If the video conference indicator is set, and the associated premium channel is in the video conference mode, then the video conference is viewable. If the indicator is CLEAR, the IRB will display the 'Video Conference' screen, if configured or skip the channel entirely. Again, if a 'Video Conference' screen is configured a room occupant is informed immediately of the reason why the particular channel is not viewable.

Transactions or instructions from the headend to the IRBs in a particular system are sent to configure the IRBs. A Global Premium Configuration globally set the various parameters needed by all the current premium shows. The parameters required include: the barker entry screen number (the first screen upon entering the barker scenario), the preview screen number (the screen to be overlaid on top of the video screen being shown), the second barker screen number, the no previews screen number (the screen to notify that there are no previews left), the override screen number (the screen to notify that the current IRB is under override), the video conference screen number (the screen to notify that the current IRB is showing a video conference), the pre-buy screen number (the screen to notify that premium shows must be pre-paid for to be viewed), and the off mode screen number (the screen to notify that a premium channel is currently not available).

The first barker screen, the preview screen, and the second barker screen may be set to zero but the purchase capability is lost. If any of the other screen numbers are set to zero, the premium channels that happen to require that particular screen will be treated as invalid when attempts are made to access them.

A 'Premium Mode' command sets the premium mode for the given premium channel at the IRB at short address/long address. The mode has valid values of 0 for free, 1 for premium, 2 for off, and 3 for video conferencing. This command has no effect on the override, prebuy, purchased, or video conference attribute bits in the functions described above.

Figure 15:
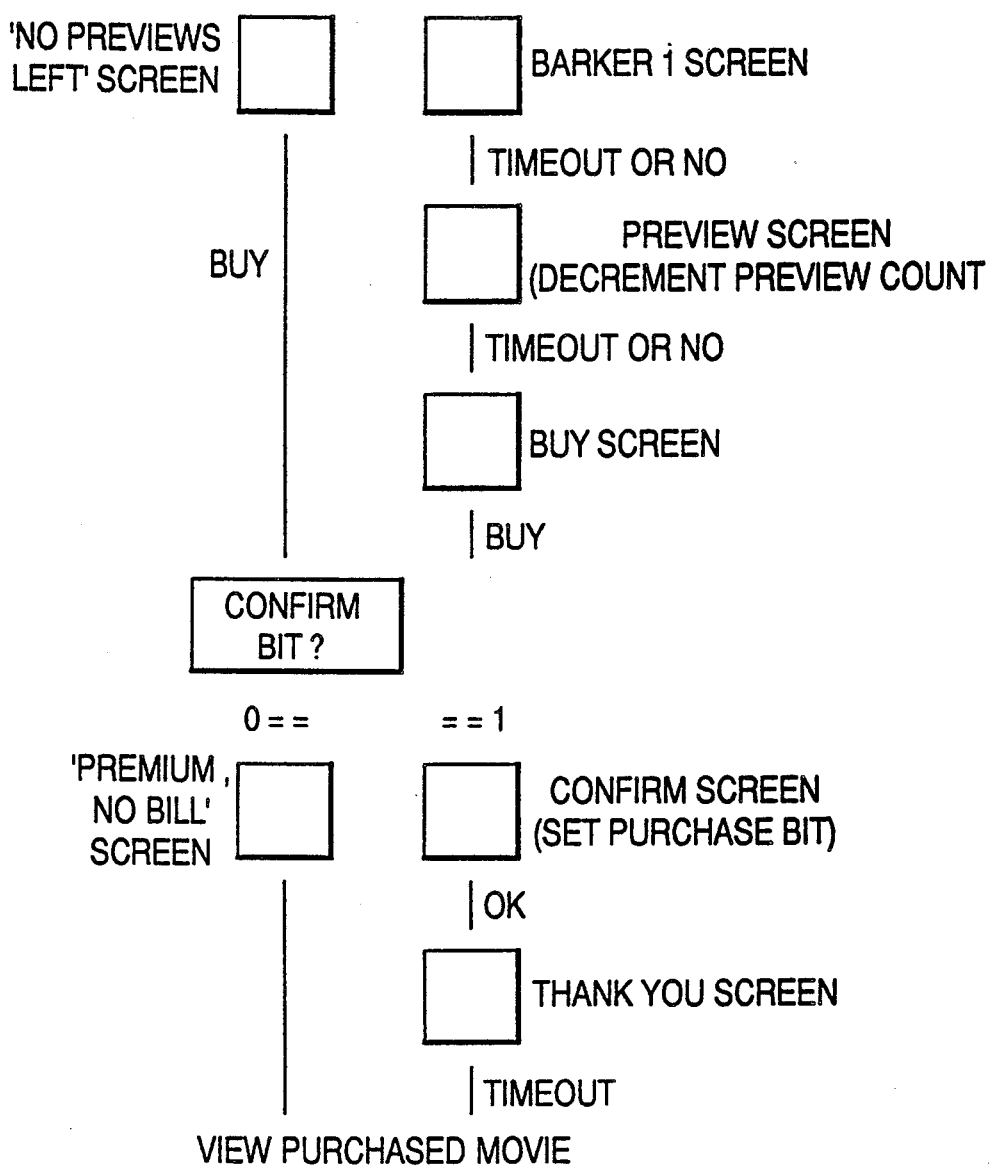
FIG. 15 is a flowchart illustrating the purchase scenario.

The premium purchase scenario described in detail below with reference to FIG. 15 is designed to utilize the enhanced screen feature handling of the present invention. It will be apparent that additions or alterations may be made easily to the purchase scenario. Any screen can be removed from the scenario by setting the appropriate screen number to 0 and not utilizing it as a goto screen. The premium purchase scenario works in conjunction with the globally configured screens. These screens include the 'Barker 1' screen, 'Preview' screen, 'Buy' screen, 'Confirm' screen, 'Premium, No Bill' screen and 'No Previews Left' screen. Screens associated with non purchase modes e.g. ('Override' screen, 'Premium Off' screen) are also discussed below.

The 'Barker 1' screen begins the purchase scenario. When the user tunes a particular premium channel, the IRB checks the premium mode. If the channel is in premium mode and is able to be purchased (not on overrides or prebuys and not purchased), the IRB will display the 'Barker 1' screen. If no 'Barker 1' screen is configured, the 'Preview' screen is displayed. If the 'Preview' screen is not configured, the 'Buy' screen will be displayed. If the 'Buy' screen is not configured either, the channel will be skipped. All transitions between purchase scenario screens must be configured with the goto field of the key templates. These go to fields are not hard coded, with the exception of the confirm bit handling. The goto field of the key template is simply a map which determines which screen is displayed by actuation of a particular key. As noted, only the confirm bit handling is hard coded and the remaining gotos may be configured to meet site specific requirements.

The 'No Previews Left' screen is a combination of the 'Barker 1' screen and the 'Buy' screen. If no more previews may be viewed for the particular premium channel, this screen will be displayed. The 'No Previews Left' screen may be configured to allow the user to purchase the premium show without first viewing a preview. The actual purchase conditions will be described below.

The 'Preview' screen shows a preview of the program to be purchased. The IRB checks the currently viewed screen with the configured 'Preview' screen. If a match exists, the preview count for the individual premium is decremented. The 'Preview' screen should use the onscreen attributes of the text generator to view text along with background video. EIA channels of 101 (alternate premium video) or 102 (premium background channel) should be used unless a dedicated video channel for all premium previews is used. The IRB appropriately tunes the desired background if configured correctly (using the premium channel EIA found in the channel map or the alternate premium channel found in the individual premium data).

The 'Buy' screen is necassary to inform the user how to purchase the premium program. The key with which to make the purchase is determined through the key template actions. This key is not hard coded but the logical choice is the 'BUY' key with the template action 'Set purchased flag for premium channel'. This key mode is conditional. It is based upon whether a confirm screen is configured for the system and whether the individual confirm bit is SET or CLEAR. If no confirm screen is configured, the purchased flag will be SET and the corresponding goto will be acted upon. This should lead to the 'Thank you' screen or directly to the premium channel. If a confirm screen is configured, the IRB examines the state of the confirm bit. If SET, the goto corresponding to the entered key will be acted upon. This should be configured to jump to the 'Confirm' screen. The purchase flag is not set at this time. If, however, the confirm bit is CLEAR, signifying the confirm screen should not be used since the System Manager mode is Premium, No Bill, the IRB will jump (hard coded) to the configured 'Premium, No Bill' screen instead of the screen configured goto. 'Premium, No Bill' refers to a mode in which premium programming may be viewed by a hotel guest without charge. For example, suppose a premium program is scheduled to run from 1:00–3:00. The system managers can determine that after a predetermined time, say 2:30, guests who request to view the program will not be charged. A screen is preferably configured to inform the guest that there is no billing for this viewing. If no 'Premium, No Bill' screen is configured, the premium channel with no header will be displayed. The purchase bit will also be SET.

The 'Confirm' screen, if configured, is the only screen from which the purchase flag may be SET, if the confirm bit is also SET. The purchase scenario may appear to buy the premium show, but if the configured 'Confirm' screen doesn't match the screen where a key was configured with the action 'Set purchased flag for the premium channel', the flag will never be set and returning to the channel will force the user to go through the purchase scenario again. The System Manager cannot issue a bill since the purchase was never actually made. Once the premium is purchased, the IRB should be configured to jump to a 'Thank you' screen or directly to the purchased channel itself.

The 'Premium, No Bill' screen is only used in the event the confirm bit CLEARed. This is the only IRB direct jump (hard code) in the premium scenario. If not configured, the IRB will jump directly to the premium channel with no header display.

The 'Thank you' screen is not a configurable screen but can be utilized by configuring it after a premium purchase as part of the key template goto command. If used, it should be prefetched from ALL premium scenario screens in order that it always resides in memory.

A "set confirm flag" command may be issued by the system manager. The command is used to set and clear the confirm indicator for the given premium channel for the IRB at [short address/long address]. If the confirm indicator is set then the confirm screen is required as part of the normal barker/purchase scenario described above.

Several other screens exist to be viewed as a result of a premium mode. These include the 'Override' screen, 'Prebuy' screen, 'Premium Off' screen and 'Video Conference' screen.

If the override bit for the individual premium is SET, the 'Override' screen, if configured, will be displayed when tuning the premium channel. If the premium channel was previously purchased, it will be unable to view the purchased video. If no Override screen is configured, the channel will be skipped.

If the prebuy bit is SET, the 'Prebuy' screen, if configured, will be displayed instead of the barker screens. IF no 'Prebuy' screen is configured, the channel will be skipped. If the prebuy bit is CLEAR, the IRB will handle its premium scenario normally. Unlike the override bit, the prebuy bit cannot override a purchased premium channel.

The video conference bit can take effect only during the Video Conference mode. If the bit is SET, video may be viewed without purchase. If CLEAR, the IRB will display the 'Video Conference' screen if configured, or skip the channel entirely.

If the current video mode is Off, the IRB can be configured to view a 'Premium Off' screen. If none is configured, the channel will be skipped.

The present invention relates to a method for establishing authorizations to control an interactive terminal used by hotel guests to request a range of hotel provided services, wherein specially tailored authorization levels are assigned to the channels via which the services may be requested. By way of a brief overview, an in-room TV set top terminal (STT) is configured as a multipurpose device having a selection of input keys through which the guest may call for a variety of services (including pay TV programs), and further includes an interactive capability tied to locally stored prompting screens displayed directly on the TV. Each hotel room has its own STT, all of which are routed by two-way RF communications to a central hotel location designated as the "system manager" where they are monitored and serviced.

To exercise control over the STTs, the "system manager" initially associates four globally possible modes of channel authorization, namely: free; off (disabled); premium; and video conferencing—in the memory of each STT. Thereafter, individually addressed flags may be assigned to a particular terminal and associated with the premium channels to implement additional levels of control. These levels include: premium no bill; video conferencing enabling; override for parental control; and pre-buy for a premium program—thereby allowing the "system manager" to reconfigure the authorizations at each STT for particular circumstances.

As an example of typical uses—should the "system manager" download an override parental flag for a particular service (channel), responsive to a hotel customer's request, other persons in that room are precluded from ordering that service. Other exemplary uses of the authorization levels include the "system manager" establishing free premium channel access for certain floors of the hotel; or linking together a number of particularly addressed terminals for video conferencing, while deauthorizing other rooms from accessing the conference program. Attempts by guest to gain access to a thus disabled or deauthorized channel actuate a screen message advising the requester of its intentionally unavailable status. The ability of the system of the present invention is to inform a guest of why certain programming is unavailable promotes a user friendly interface and eases resolution of problems which may arise when a guest is unable to tune certain channels.

While the foregoing description is directed to a presently preferred embodiment, it will be apparent to those of ordinary skill that various modifications may be made without departing from the true spirit or scope of the invention which is to be limited only by the appended claims

We claim:

1. Terminal apparatus for use in a cable television system which provides a plurality of channels capable of being tuned for display at a television receiver, said apparatus comprising:
   communication means for interactively communicating with a system manager of the cable television system;
   memory means for storing data for composing a plurality of predetermined character screens and for storing video conferencing data, the data for composing the plurality of predetermined character screens comprising character screen commands, the video conferencing data for deauthorizing the viewing of at least one video conference channel;
   character generator means for generating character screens from the stored character screen composition data at said television receiver;
   deauthorization means responsive to the video conferencing data in the memory means for deauthorizing selected ones of said plurality of channels; and
   control means for controlling said memory means and said character generator means and for composing at least one predetermined character screen for displaying at said television receiver the deauthorization of the viewing of a video conference channel by said deauthorization means.

2. Terminal apparatus for use in a cable television system which provides a plurality of channels capable of being tuned for display at a television receiver, said apparatus comprising:
   memory means for storing data for composing a plurality of predetermined character screens and for storing deauthorization data, the data for composing the plurality of predetermined character screens comprising character screen commands;
   character generator means for generating character screens from the stored character screen composition data at said television receiver;
   deauthorization means responsive to the deauthorization data in the memory means for deauthorizing selected ones of said plurality of channels; and
   control means for controlling said memory means and said character generator means and for composing at least one predetermined character screen for displaying at said television receiver the deauthorization of a channel by said deauthorization means.

3. The terminal apparatus of claim 2 wherein the control means is a microprocessor.

4. The terminal apparatus of claim 3 wherein the memory means is a random access memory.

5. The terminal apparatus of claim 2 further comprising:
   said memory means for further storing preview data, the preview data allowing a premium channel to be viewed for a predetermined period of time without incurring a charge;
   preview means responsive to the stored preview data for previewing selected ones of the plurality of channels; and
   said control means for further controlling said memory means and said character generator means and for composing at least one predetermined character screen for displaying at the television receiver information in accordance with the preview of a premium channel by said preview means.

6. The terminal apparatus of claim 2 further comprising:
   said memory means for further storing prebuy data, the prebuy data related to a user credit status;
   prebuy means responsive to the prebuy data in the memory means for deauthorizing the viewing of premium programs; and
   said control means for further controlling said memory means and said character generator means and for composing at least one predetermined character screen for displaying at the television receiver the user credit status in accordance with the deauthorization of the viewing of premium programs by said prebuy means.

7. The terminal apparatus of claim 5 further comprising:
   said memory means for further storing prebuy data, the prebuy data related to a user credit status;
   prebuy means responsive to the prebuy data in the memory means for deauthorization the viewing of premium programs;
   said control means for further controlling said memory means and said character generator means and for composing at least one predetermined character screen for displaying at the television receiver the user credit status in accordance with the deauthorization of the viewing of premium programs by said prebuy means.

8. The terminal apparatus of claim 2 wherein:

said memory means for further storing video conferencing data, the video conferencing data for deauthorizing the viewing of at least one video conference channel;

said deauthorization means for further responding to the video conferencing data in the memory means for deauthorizing selected ones of the plurality of channels; and said control means for further controlling said memory means and said character generator means and for composing at least one predetermined character screen for displaying at the television receiver the deauthorization of the viewing of a video conference channel by said deauthorization means.

9. The terminal apparatus of claim 5 wherein:

said memory means for further storing video conferencing data, the video conferencing data for deauthorizing the viewing of at least one video conference channel;

said deauthorization means for further responding to the video conferencing data in the memory means for deauthorizing selected ones of the plurality of channels; and said control means for further controlling said memory means and said character generator means and for composing at least one predetermined character screen for displaying at the television receiver the deauthorization of the viewing of a video conference channel by said deauthorization means.

10. Terminal apparatus for use in a cable television system which provides a plurality of channels capable of being tuned for display at a television receiver, said apparatus comprising:

memory means for storing data for composing a plurality of predetermined character screens and for storing preview data, the data for composing the plurality of predetermined character screens comprising character screen commands, the preview data allowing a premium channel to be viewed for a predetermined period of time without incurring a charge;

character generator means for generating character screens from the stored character screen composition data at said television receiver;

preview means responsive to the stored preview data for previewing selected ones of the plurality of channels; and control means for controlling said memory means and said character generator means and for composing at least one predetermined character screen for displaying at said television receiver information in accordance with the preview of a premium channel by said preview means.

11. The terminal apparatus of claim 10 further comprising:

said memory means for further storing prebuy data, the prebuy data related to a user credit status;

prebuy means responsive to the prebuy data in the memory means for deauthorizing the viewing of premium programs; and said control means for further controlling said memory means and said character generator means and for composing at least one predetermined character screen for displaying at the television receiver the user credit status in accordance with the deauthorization of the viewing of premium programs by said prebuy means.

12. The terminal apparatus of claim 11 wherein:

said memory means for further storing video conferencing data, the video conferencing data for deauthorizing the viewing of at least one video conference channel;

said deauthorization means for further responding to the video conferencing data in the memory means for deauthorizing selected ones of the plurality of channels; and said control means for further controlling said memory means and said character generator means and for composing at least one predetermined character screen for displaying at the television receiver the deauthorization of the viewing of a video conference channel by said deauthorization means.

13. Terminal apparatus for use in a cable television system which provides a plurality of channels capable of being tuned for display at a television receiver, said apparatus comprising:

memory means for storing data for composing a plurality of predetermined character screens and for storing prebuy data, the data for composing the plurality of predetermined character screens comprising character screen commands, the prebuy data related to a user credit status;

character generator means for generating character screens from the stored character screen composition data at said television receiver;

prebuy means responsive to the prebuy data in the memory means for deauthorizing the viewing of premium programs; and control means for controlling said memory means and said character generator means and for composing at least one predetermined character screen for displaying at the television receiver the user credit status in accordance with the deauthorization of the viewing of premium programs by said prebuy means.

14. The terminal apparatus of claim 13 wherein:

said memory means for further storing video conferencing data, the video conferencing data for deauthorizing the viewing of at least one video conference channel;

said deauthorization means for further responding to the video conferencing data in the memory means for deauthorizing selected ones of the plurality of channels; and said control means for further controlling said memory means and said character generator means and for composing at least one predetermined character screen for displaying at the television receiver the deauthorization of the viewing of a video conference channel by said deauthorization means.

15. Terminal apparatus for use in a cable television system which provides a plurality of channels capable of being tuned for display at a television receiver, said apparatus comprising:

memory means for storing data for composing a plurality of predetermined character screens and for storing video conferencing data, the data for composing the plurality of predetermined character screens comprising character screen commands, the video conferencing data for deauthorizing the viewing of at least one video conference channel;

character generator means for generating character screens from the stored character screen composition data at said television receiver;

deauthorization means responsive to the video conferencing data in the memory means for deauthorizing selected ones of said plurality of channels; and control means for controlling said memory means and said character generator means and for composing at least one predetermined character screen for displaying at said television receiver the deauthorization of the viewing of a video conference channel by said deauthorization means.

16. Terminal apparatus for use in an interactive cable television system which provides a plurality of channels capable of being tuned for display at a television receiver, said apparatus comprising:

communication means for interactively communicating with a system manager of the cable television system;

memory means for storing data for composing a plurality of predetermined character screens and for storing deauthorization data, the data for composing the plurality of predetermined character screens comprising character screen commands;

character generator means for generating character screens from the stored character screen composition data at said television receiver;

deauthorization means responsive to the deauthorization data in the memory means for deauthorizing selected ones of said plurality of channels; and control means for controlling said memory means and said character generator means and for composing at least one predetermined character screen for displaying at said television receiver the deauthorization of a channel by said deauthorization means.

17. The terminal apparatus of claim 16 wherein the control means is a microprocessor.

18. The terminal apparatus of claim 16 wherein the memory means is a random access memory.

19. The terminal apparatus of claim 16 further comprising:

said memory means for further storing preview data, the preview data allowing a premium channel to be viewed for a predetermined period of time without incurring a charge;

preview means responsive to the preview data in the memory means for previewing selected ones of the plurality of channels; and said control means for further controlling said memory means and said character generator means and for composing at least one predetermined character screen for displaying at the television receiver information in accordance with the preview of a premium channel by said preview means.

20. The terminal apparatus of claim 16 further comprising:

said memory means for further storing prebuy data, the prebuy data related to a user credit status;

prebuy means responsive to the prebuy data in the memory means for deauthorizing the viewing of premium programs; and said control means for further controlling said memory means and said character generator means for composing at least one predetermined character screen for display at the television receiver the user credit status in accordance with the deauthorization of the viewing of premium programs by said prebuy means.

21. The terminal apparatus of claim 19 further comprising:

said memory means for further storing prebuy data, the prebuy data related to a user credit status;

prebuy means responsive to the prebuy data in the memory means for deauthorizing the viewing of premium programs; and said control means for further controlling said memory means and said character generator means and for composing at least one predetermined character screen for displaying at the television receiver the user credit status in accordance with the deauthorization of the viewing of premium programs by said prebuy means.

22. The terminal apparatus of claim 16 wherein:

said memory means for further storing video conferencing data, the video conferencing data for deauthorizing the viewing of at least one video conference channel;

said deauthorization means for further responding to the video conferencing data in the memory means for deauthorizing selected ones of the plurality of channels; and said control means for further controlling said memory means and said character generator means and for composing at least one predetermined character screen for displaying at the television receiver the deauthorization of the viewing of a video conference channel by said deauthorization means.

23. The terminal apparatus of claim 19 wherein:

said memory means for further storing video conferencing data, the video conferencing data for deauthorizing the viewing of at least one video conference channel;

said deauthorization means for further responding to the video conferencing data in the memory means for deauthorizing selected ones of the plurality of channels; and said control means for further controlling said memory means and said character generator means and for composing at least one predetermined character screen for displaying at the television receiver the deauthorization of the viewing of a video conference channel by said deauthorization means.

24. The terminal apparatus of claim 21 wherein:

said memory means for further storing video conferencing data, the video conferencing data for deauthorizing the viewing of at least one video conference channel;

said deauthorization means for further responding to the video conferencing data in the memory means for deauthorizing selected ones of the plurality of channels; and said control means for further controlling said memory means and said character generator means and for composing at least one predetermined character screen for displaying at the television receiver the deauthorization of the viewing of a video conference channel by said deauthorization means.

25. Terminal apparatus for use in a cable television system which provides a plurality of channels capable of being tuned for display at a television receiver, said apparatus comprising:

communication means for interactively communicating with a system manager of the cable television system;

memory means for storing data for composing a plurality of predetermined character screens and for storing preview data, the data for composing the plurality of predetermined character screens comprising character screen commands, the preview data allowing a premium channel to be viewed for a predetermined period of time without incurring a charge;

character generator means for generating character screens from the stored character screen composition data at said television receiver;

preview means responsive to the stored preview data for previewing selected ones of the plurality of channels; and control means for controlling said memory means and said character generator means and for composing at least one predetermined character screen for displaying at said television receiver information in accordance with the preview of a premium channel by said preview means.

26. The terminal apparatus of claim 25 further comprising:

said memory means for further storing prebuy data, the prebuy data related to a user credit status;

prebuy means responsive to the prebuy data in the memory means for deauthorizing the viewing of premium programs; and said control means for further controlling said memory means and said character generator means and for composing at least one predetermined character screen for displaying at the television receiver the user credit status in accordance with the deauthorization of the viewing of premium programs by said prebuy means.

27. The terminal apparatus of claim 26 wherein:

said memory means for further storing video conferencing data, the video conferencing data for deauthorizing the viewing of at least one video conference channel;

said deauthorization means for further responding to the video conferencing data in the memory means for deauthorizing selected ones of the plurality of channels; and said control means for further controlling said memory means and said character generator means and for composing at least one predetermined character screen for displaying at the television receiver the deauthorization of the viewing of a video conference channel by said deauthorization means.

28. Terminal apparatus for use in a cable television system which provides a plurality of channels capable of being tuned for display at a television receiver, said apparatus comprising:

communication means for interactively communicating with a system manager of the cable television system;

memory means for storing data for composing a plurality of predetermined character screens and for storing prebuy data, the data for composing the plurality of predetermined character screens comprising character screen commands, the prebuy data related to a user credit status;

character generator means for generating character screens from the stored character screen composition data at said television receiver;

prebuy means responsive to the prebuy data in the memory means for deauthorizing the viewing of premium programs; and control means for controlling said memory means and said character generator means and for composing at least one predetermined character screen for displaying at the television receiver the user credit status in accordance with the deauthorization of the viewing of premium programs by said prebuy means.

29. The terminal apparatus of claim 28 wherein:

said memory means for further storing video conferencing data, the video conferencing data for deauthorizing the viewing of at least one video conference channel;

said deauthorization means for further responding to the video conferencing data in the memory means for deauthorizing selected ones of the plurality of channels; and said control means for further controlling said memory means and said character generator means and for composing at least one predetermined character screen for displaying at the television receiver the deauthorization of the viewing of a video conference channel by said deauthorization means.

30. A terminal control method for a cable television system which provides a plurality of channels capable of being tuned for display at a television receiver, said method of comprising the steps of:

storing data for composing a plurality of predetermined character screens, the stored data for composing the plurality of predetermined character screens comprising character screen commands;

storing deauthorization data;

composing character screens from the stored character screen composition data for display at said television receiver;

deauthorizing selected ones of said plurality of channels in response to the stored deauthorization data; and displaying the at least one predetermined character screen at said television receiver when a deauthorized channel is selected, the at least one predetermined character screen related to the deauthorization of a channel.

31. The method of claim 30 further comprising the steps of:

storing preview data, the preview data for viewing a premium channel for a predetermined period of time without incurring a charge;

composing at least one predetermined character screen from the stored preview data; and outputting the at least one predetermined character screen, the at least one predetermined character screen related to information in accordance with concerning the preview of a premium channel.

32. The method of claim 30 further comprising the steps of:

storing prebuy data, the prebuy data related to a user credit status;

composing at least one predetermined character screen from the stored prebuy data; and outputting the at least one predetermined character screen, the at least one predetermined character screen related to prebuy information.

33. The method of claim 31 further comprising the steps of:

storing prebuy data, the prebuy data related to a user credit status;

composing at least one predetermined character screen from the stored prebuy data; and outputting the at least one predetermined character screen, the at least one predetermined character screen related to prebuy information.

34. The method of claim 30 further comprising the steps of:
storing video conferencing data, the video conferencing data for deauthorizing the viewing of at least one video conference channel;
composing at least one predetermined character screen from the stored video conferencing data;
deauthorizing selected ones of the plurality of channels in response to the stored video conferencing data; and
outputting the at least one predetermined character screen, the at least one predetermined character screen related to the deauthorization of the viewing of video conferencing channel.

35. The method of claim 32 further comprising the steps of:
storing video conferencing data, the video conferencing data for deauthorizing the viewing of at least one video conference channel;
composing at least one predetermined character screen from the stored video conferencing data;
deauthorizing selected ones of the plurality of channels in response to the stored video conferencing data; and
outputting the at least one predetermined character screen, the at least one predetermined character screen related to the deauthorization of the viewing of video conferencing channel.

36. The method of claim 30 further comprising the steps of:
storing preview data, the preview data for viewing a preminum channel for a predetermined period of time without incurring a charge;
composing at least one predetermined character screen from the stored preview data; and
displaying the at least one predetermined character screen, the at least one predetermined character screen related to information in accordance with the preview of a premium channel.

37. The method of claim 30 further comprising the steps of:
storing prebuy data, the prebuy data related to a user credit status;
composing at least one predetermined character screen from the stored prebuy data; and
displaying the at least one predetermined character screen, the at least one predetermined character screen related to prebuy information.

38. The method of claim 36 further comprising the steps of:
storing prebuy data, the prebuy data related to a user credit status;
composing at least one predetermined character screen from the stored prebuy data; and
displaying the at least one predetermined character screen, the at least one predetermined character screen related to prebuy information.

39. The method of claim 30 further comprising the steps of:
storing video conferencing data, the video conferencing data for deauthorizing the viewing of at least one video conference channel;
composing at least one predetermined character screen from the stored video conferencing data;
deauthorizing selected ones of the plurality of channels in response to the stored video conferencing data; and
displaying the at least one predetermined character screen, the at least one predetermined character screen related to the deauthorization of the viewing of video conferencing channel.

40. The method of claim 37 further comprising the steps of:
storing video conferencing data, the video conferencing data for deauthorizing the viewing of at least one video conference channel;
composing at least one predetermined character screen from the stored video conferencing data;
deauthorizing selected ones of the plurality of channels in response to the stored video conferencing data; and
outputting the at least one predetermined character screen, the at least one predetermined character screen related to the deauthorization of the viewing of video conferencing channel.

41. A terminal control method for a cable television system which provides a plurality of channels capable of being tuned for display at a television receiver, said method of comprising the steps of:
storing data for composing a plurality of predetermined character screens, the stored data for composing the plurality of predetermined character screens, comprising character screen commands;
storing preview data, the preview data for viewing a premium channel for a predetermined period of time without incurring a charge;
composing character screens from the stored character screen composition data at said television receiver, at least one predetermined character screen from the stored preview data; and
outputting the at least one predetermined character screen, the at least one predetermined character screen related to information in accordance with the preview of a premium channel.

42. The method of claim 41 further comprising the step of:
displaying the at least one predetermined character screen related to information in accordance with the preview of a premium channel.

43. The method of claim 41 further comprising the steps of:
storing prebuy data, the prebuy data related to a user credit status;
composing at least one predetermined character screen from the stored prebuy data; and
outputting the at least one predetermined character screen, the at least one predetermined character screen related to prebuy information.

44. The method of claim 43 further comprising the step of:
displaying the at least one predetermined character screen related to prebuy information.

45. The method of claim 41 further comprising the steps of:
storing video conferencing data, the video conferencing data for deauthorizing the viewing of at least one video conference channel;
composing at least one predetermined character screen from the stored video conferencing data;
deauthorizing selected ones of the plurality of channels in response to the stored video conferencing data; and outputting the at least one predetermined character screen, the at least one predetermined character screen related to the deauthorization of the viewing of video conferencing channel.

46. The method of claim 45 further comprising the step of:
displaying the at least one predetermined character screen related to the deauthorization of the viewing of video conferencing channel.

47. The method of claim 45 further comprising the steps of:
displaying the at least one predetermined character screen related to information concerning the preview of a premium channel;
displaying the at least one predetermined character screen related to prebuy information;
displaying the at least one predetermined character screen related to the deauthorization of the viewing of video conferencing channel.

48. A terminal control method for a cable television system which provides a plurality of channels capable of being tuned for display at a television receiver, said method of comprising the steps of:
storing data for composing a plurality of predetermined character screens, the stored data for composing the plurality of predetermined character screens comprising character screen commands;
storing prebuy data, the prebuy data related to a user credit status;
composing at least one predetermined character screen from the stored prebuy data; and
outputting the at least one predetermined character screen, the at least one predetermined character screen related to prebuy information.

49. The method of claim 48 further comprising the steps of:
storing video conferencing data, the video conferencing data for deauthorizing the viewing of at least one video conference channel;
composing at least one predetermined character screen from the stored video conferencing data;
deauthorizing selected ones of the plurality of channels in response to the stored video conferencing data; and
outputting the at least one predetermined character screen, the at least one predetermined character screen related to the deauthorization of the viewing of video conferencing channel.

50. The method of claim 49 further comprising the step of:
displaying the at least one predetermined character screen related to the deauthorization of the viewing of video conferencing channel.

51. The method of claim 49 further comprising the steps of:
displaying the at least one predetermined character screen related to prebuy information;
displaying the at least one predetermined character screen related to the deauthorization of the viewing of video conferencing channel.

52. The method of claim 48 further comprising the step of:
displaying the at least one predetermined character screen related to prebuy information.

53. A terminal control method for a cable television system which provides a plurality of channels capable of being tuned for display at a television receiver, said method of comprising the steps of:
storing video conferencing data, the video conferencing data for deauthorizing the viewing of at least one video conference channel;
composing at least one predetermined character screen from the stored video conferencing data;
deauthorizing selected ones of the plurality of channels in response to the stored video conferencing data; and
outputting the at least one predetermined character screen, the at least one predetermined character screen related to the deauthorization of the viewing of video conferencing channel.

54. The method of claim 53 further comprising the step of:
displaying the at least one predetermined character screen related to the deauthorization of video conferencing channel.

* * * * *